(12) United States Patent
Fujimori

(10) Patent No.: US 7,796,140 B2
(45) Date of Patent: Sep. 14, 2010

(54) PROJECTION SYSTEM, INFORMATION PROCESSING APPARATUS AND METHOD OF GENERATING MODIFIED-IMAGE DATA

(75) Inventor: Toshiki Fujimori, Chino (JP)

(73) Assignee: Seiko Epson Corporation, Tokyo (JP)

( * ) Notice: Subject to any disclaimer, the term of this patent is extended or adjusted under 35 U.S.C. 154(b) by 502 days.

(21) Appl. No.: 11/470,116

(22) Filed: Sep. 5, 2006

(65) Prior Publication Data

US 2007/0058861 A1 Mar. 15, 2007

(30) Foreign Application Priority Data

Sep. 9, 2005 (JP) ............................. 2005-262826

(51) Int. Cl.
*G09G 5/02* (2006.01)
(52) U.S. Cl. ...................................... 345/589; 353/46
(58) Field of Classification Search ................. 353/30, 353/46; 345/589
See application file for complete search history.

(56) References Cited

U.S. PATENT DOCUMENTS

| 5,940,049 | A | * | 8/1999 | Hinman et al. ............... 353/20 |
| 6,301,301 | B1 | * | 10/2001 | Isu et al. ................ 375/240.14 |
| 6,456,339 | B1 | * | 9/2002 | Surati et al. .................. 348/745 |
| 6,819,395 | B2 | * | 11/2004 | Werner .......................... 352/40 |
| 6,837,582 | B2 | | 1/2005 | Yamagishi |
| 6,989,823 | B1 | * | 1/2006 | Lasneski ...................... 345/204 |
| 7,175,285 | B2 | * | 2/2007 | Li et al. ......................... 353/70 |
| 2003/0184714 | A1 | * | 10/2003 | Yamagishi .................... 353/31 |
| 2003/0234794 | A1 | * | 12/2003 | Kanai ........................... 345/600 |
| 2004/0255029 | A1 | * | 12/2004 | Manion et al. ............... 709/227 |
| 2004/0267981 | A1 | * | 12/2004 | Kakemura ..................... 710/48 |
| 2005/0013492 | A1 | * | 1/2005 | Hattori ......................... 382/232 |
| 2005/0073510 | A1 | * | 4/2005 | Martin et al. ................ 345/204 |
| 2005/0140993 | A1 | * | 6/2005 | Kuwata ....................... 358/1.9 |
| 2005/0151936 | A1 | * | 7/2005 | Nonaka ......................... 353/84 |
| 2005/0168705 | A1 | * | 8/2005 | Li et al. ......................... 353/69 |
| 2006/0001836 | A1 | * | 1/2006 | Kobori et al. ................. 353/30 |
| 2006/0215115 | A1 | * | 9/2006 | Long et al. .................... 352/38 |

FOREIGN PATENT DOCUMENTS

| CN | 1447595 A | 10/2003 |
| CN | 1591385 A | 3/2005 |
| JP | A 2004-69996 | 3/2004 |

* cited by examiner

*Primary Examiner*—Xiao M Wu
*Assistant Examiner*—Maurice McDowell, Jr.
(74) *Attorney, Agent, or Firm*—Oliff & Berridge, PLC

(57) ABSTRACT

A projection system includes: an information processing apparatus that carries out image processing on an image of an image source; a projector that projects an image based on an image data signal outputted from the information processing apparatus; and a signal transmission unit that carries signals between the information processing apparatus and the projector. The information processing apparatus compares latest image data with preceding image data, and detects, as a modified part, part of the latest image data that is modified from the preceding image data and generates modified-image data of the modified part by adding color-tone data to each pixel in the modified part. The projector generates a new current-image frame based on the modified-image data from the information processing apparatus. The modified part is detected with an accuracy of not more than the amount of information indicating the color tone of each pixel of the image source.

6 Claims, 25 Drawing Sheets

PROJECTION SYSTEM, INFORMATION PROCESSING APPARATUS AND METHOD OF GENERATING MODIFIED-IMAGE DATA

BACKGROUND

1. Field of the Invention

The present invention relates to a projection system, information processing apparatus and method of generating modified-image data.

2. Related Art

In general, a projector is well known as an image projection apparatus.

There is also well known a protection system that includes a PC serving as an information processing apparatus that carries out shape correction or color-color-tone correction of an image source, a projector that projects an image corrected by the PC on a screen, and a USB cable serving as a data transmission path between the PC and the projector (see JP-A-2004-69996).

In the projection system, the image source inputted to the PC is image-processed by an image processing unit of the PC.

Examples of the image processing include trapezoid correction for correcting trapezoid distortion produced by a disposition between the projector and the screen, or color-color-tone correction for correcting unevenness luminance or color produced by color characteristics of the projector. Image data that is image-processed by the PC is transmitted to the projector via the USB cable. When the image data is projected from the protector onto the screen, a predetermined image is displayed on the screen.

In the above-mentioned construction, since the image processing is carried out mainly on the PC, and the projector just projects the image data but does not carry out complex image processing, it is possible to simplify the construction of projector. In addition, since the PC has a graphic processing function, it is possible to carry out high-precision image correction without adding new functions to the PC.

In a case where an image source is a moving image, when the transmission rate of USB cable is low, it takes long time for single image data to be transmitted. Thus, the frame rate of image displayed by the projector becomes low, such that the moving image is not properly played. For instance, since the frame rate required for satisfactory playback of moving image is 30 frames/sec, it is not possible to transmit the whole image data using the USB2.0 cable. For instance, while a stable communication rate for the USB2.0 cable is about 240 Mbps, an image having XGA resolution (1024×768 dots) and color information of 30 bits/pixel has about a data amount of 25 Mbits. In this case, the image data can be transmitted only at a frame rate of 9 frames/sec. Even though the communication is made at a maximum communication rate of 480 Mbps in theory, the frame rate is just 18 frames/sec, which is not appropriate for playback of the moving image.

JP-A-2004-69996 discloses that the frame rate is maintained at an appropriate level by reducing a necessary amount of transmitted data by differential data transmission of preceding image data (see paragraph 0048 of JP-A-2004-69996). In JP-A-2004-6996, the PC generates and transmits differential data to the projector, and the projector generates current-image frame data by synthesizing the preceding image and the differential data. The current-image frame data is projected from the projector onto the screen.

While JP-A-2004-69996 proposes that the transmission data is reduced by 'differential data transmission', it does not disclose a method of generating the 'differential data'. In order to properly display images projected by a projector onto a screen, image data is required to be subject to shape correction, such as trapezoid correction, or color-color-tone correction, such as unevenness of color. At this time, it is a problem how to generate the differential data that is required to properly represent current-image frame data required for appropriate image projection by means of the projector.

SUMMARY

An advantage of some aspects of the invention is to provide a projection system, information processing apparatus, method of generating modified-image data, program for generating modified-image data, and recording medium for recording the program, which can appropriately represent current-image frame data by a projector.

According to an aspect of the invention, there is provided a projection system including: an information processing apparatus that carries out image processing on an image of an image source in which color tone of each pixel is represented with a predetermined amount of information; a projector that projects an image based on an image data signal outputted from the information processing apparatus; and a signal transmission unit that carries signals between the information processing apparatus and the projector, where the information processing apparatus includes: a modified-part detection unit that compares latest image data with preceding image data, and detects, as a modified part, part of the latest image data that is modified from the preceding image data; and a modified-image data generation unit that generates modified-image data of the modified part by adding color-tone data to each pixel in the modified part detected by the modified-part detection unit, where the protector includes a current-image frame generation unit that generates a new current-image frame based on the modified-image data from the information processing apparatus, and where the modified-part detection unit detects the modified part with an accuracy of not more than the amount of information indicating the color tone of each pixel of the image source.

In the above-mentioned construction, the information processing apparatus performs image processing on the image source and transmits the image data signal to the projector. The projector generates the current-image frame data based on the received image data signal, and projects the current-image frame data onto the screen.

In the information processing apparatus, the modified-part detection unit detects, as a modified part, part of the latest shape-converted image data that is modified from the preceding shape-converted image data. The modified part detected by the modified-part detection unit is a modified 'part' when the preceding image is changed to a current image. At this time, color information is not included in the modified part. Accordingly, the modified-image data generation unit generates the modified-image data of the modified part by adding color-color-tone data to each pixel in the modified part. The modified-image data is transmitted to the projector through the signal transmission unit. The current-image frame data is generated in the projector based on the modified-image data. That is, since the modified part, which is part of the latest image data modified from the preceding image data, and the color-color-tone data of the modified part are transmitted as the modified-image data from the information processing apparatus to the projector, latest current-image frame data that is obtained, for example, by synthesizing the current image data projected by the projector with the modified-image data is generated in the current-image frame generation unit. The current-image frame data is projected from the projector onto the screen, such that an image is displayed on the screen.

Since the modified part and the color-color-tone data of the modified part are transmitted as the modified-image data from the information processing apparatus to the projector, it is possible to remarkably reduce the amount of data to be transmitted, for example, compared to a case where all data constituting a single image frame is transmitted. The signal transmission unit generally has a predetermined maximum transmission rate. Thus, when the amount of data transmitted from the information processing apparatus to the projector is too large, it takes long time to transmit the data from the information processing apparatus to the projector. As a result, the display timing of projector is deviated from that of the image source.

In this regard, since the modified-image data, instead of a single image frame, is transmitted from the information processing apparatus to the projector in the present invention, it is possible to appropriately maintain the frame rate of the image displayed by the projector by reducing the amount of data to be transmitted.

Since the modified-part detection unit detects the modified part with an accuracy of not more than the amount of information indicating the color tone of pixel, it detects, as a modified part, only a pixel of which color tone has changed by more than a predetermined amount. Accordingly, it is possible to obtain an appropriate amount of the modified-image data without detecting an excessive number of pixels as the modified part. As a result, it is possible to appropriately maintain the frame rate on the projector by the transmission rate by the signal transmission unit.

The modified-image data is a modified one in terms of the part, but color-color-tone data is used for color-color-tone. Accordingly, when the current-image frame data is generated in the projector, it is not necessary to obtain the color information from differential data. As a result, it is possible to reduce some functions of the projector, such that the construction of projector is simplified.

In this case, a method of detecting the modified part with an accuracy of not more than the amount of information indicating the color tone will be described in detail. For instance, when color tone of each pixel in the image source consists of 8-bit data, a change in each pixel is detected with an accuracy of not more than eight bits. For example, a change in each pixel is detected with an accuracy of eight, six or four bits. In this case, it is preferable that the change of color tone is detected based on most significant bits of 8-bit data.

When it is detected based on most significant bits of the data, a major change that has a significant effect on viewing characteristic is detected but a minor change, such as minor unevenness of color that does not have a significant effect so much on the viewing characteristic is not detected. Accordingly, it is possible to contain information that is small but important in viewing characteristic as modified-image data.

In a case where color tone of each pixel in the image source is represented in 256 grayscale (corresponding to eight bits), when the modified part is detected with an accuracy of not more than the amount of information indicating the color tone, only pixels having a difference of a predetermined threshold value or more (for example, 10 grayscale or more (corresponding to 5 bits)) may be detected in addition to detection of the difference in 256 grayscale.

It is preferable that the information processing apparatus includes: a color-tone correction unit that performs color-tone correction of the image data according to color characteristics of the projector, and the modified-part detection unit detects a modified part by comparing image data with each other that are not color-tone-corrected by the color-tone correction unit.

In the above-mentioned construction, the modified part is detected by the modified-part detection unit by comparing image data prior to color-tone correction. After color-tone correction is carried out, color information of each pixel is accurately corrected. Accordingly, there is a problem in that when the image data are compared with each other after color-tone correction, approximately whole of the image is detected as a modified part.

However, in the present invention, since the modified part is detected by comparing image data that is not color-tone corrected, it is possible to appropriately detect the modified part in the image source.

It is preferable that the information processing apparatus includes a color-tone correction unit that carries out color-tone correction of the image data according to color characteristics of the projector, and the modified-part detection unit compares image data with each other that are color-tone-corrected by the color-tone correction unit, and detects the modified part with an accuracy of not more than the amount of information indicating the color tone after color-tone correction.

In the above-mentioned construction, the color-tone correction unit carries out color-tone correction of the image data, such as color conversion, $\gamma$ correction, VT-$\gamma$ correction, or unevenness of color. The modified-part detection unit detects the modified part by comparing the color-tone corrected image data with each other. At this time, the modified-part detection unit detects the modified part with an accuracy of not more than the amount of information indicating the color tone after color-tone correction. When the color-tone correction is performed on the image data, minor unevenness of color is corrected, such that the color tone of approximately whole of the pixel is modified. In addition, for example, when the color tone of each pixel in the image source is represented with eight bits, the color tone is represented with a higher accuracy, i.e. ten bits, after color-tone correction.

Since the color tone is represented with a high accuracy, all the pixels are detected as modified parts when the color tone of each pixel is compared after color-tone correction. In this case, the amount of the modified-image data may be considerably large, such that data cannot be appropriately transmitted to the projector with the transmission rate of the signal transmission unit.

However, in the present invention, since the modified part is detected with an accuracy of not more than the amount of information indicating the color tone after color-tone correction, only a pixel of which color tone has changed by more than a predetermined amount can be detected as a modified part.

For example, even though the color tone has an accuracy of 10 bit after color-tone correction, the modified part is detected based on the most significant eight bits. Accordingly, it is possible to obtain an appropriate amount of the modified-image data without detecting an excessive number of pixels as the modified part. As a result, it is possible to appropriately maintain the frame rate on the projector by the transmission rate by the signal transmission unit.

It is preferable that when detecting the modified part by comparing the image data with each other, the modified-part detection unit varies the accuracy of the amount of information that is noted among the amount of information indicating color tone.

In a case where color tone of image data is represented with ten bits, the modified part may be detected based on ten bits, eight most significant bits, or six most significant bits.

For example, when the image data consists of black and white characters, the modified part may be detected based on a few most significant bits of color-tone data. In this case, even though minor unevenness of color is not detected, it is possible to detect a modified part that is important in transmission of the character information.

When the image data contains illustration, it is necessary to detect a minor change in color tone. Thus, appropriate current-image data can be reproduced by the projector when a change in color tone is detected with a high accuracy to generate modified-image data. In the present invention, it is possible to vary the accuracy to detect the modified part according to the kind of image source.

According to another aspect of the present invention, there is provided an information processing apparatus performing image processing on an input image source, outputting and displaying the image-processed image source on a projector connected via a signal transmission unit, the information processing apparatus including: a modified-part detection unit that compares latest image data with preceding image data, and detects, as a modified part, part of the latest image data that is modified from the preceding image data; and a modified-image data generation unit that generates the modified-image data of the modified part by adding color-tone data to each pixel in the modified part detected by the modified-part detection unit, where the projector includes a current-image frame generation unit that generates a new current-image frame based on the modified-image data from the information processing apparatus, and where the modified-part detection unit detects the modified part with an accuracy of not more than the amount of information indicating the color tone of each pixel of the image source.

In the above-mentioned construction, the information processing apparatus can be appropriately applied to the projection system.

It is preferable that there is provided a projection system including: an information processing apparatus that carries out image processing on an image of an image source in which color tone of each pixel is represented with a predetermined amount of information; a projector that projects an image based on an image data signal outputted from the information processing apparatus; and a signal transmission unit that carries signals between the information processing apparatus and the projector, where the information processing apparatus includes: a modified-part detection unit that compares latest shape-converted image data with preceding image data, and detects, as a modified part, part of the latest image data that is modified from the preceding image data; a modified-image data generation unit that generates modified-image data of the modified part by adding color information to each pixel in the modified part detected by the modified-part detection unit; a current-image generation unit that generates latest current image data based on the modified-image data generated by the modified-image data generation unit; and an image preservation unit that preserves image data generated by the current-image generation unit, where the modified-part detection unit compares latest image data with preceding image data, which is preserved in the image preservation unit, detects, as a modified part, part of the latest image data that is modified from the preceding image data, and detects the modified part with an accuracy of not more than the amount of information indicating color tone of each pixel of the image source.

In the above-mentioned construction, since the modified-image data generated by the modified-image data generation unit is fed back to the current-image generation unit to generate the current-image frame data, the current-image generation unit receives the same image data as that transmitted from the information processing apparatus to the projector, and generates image data that is equal to the current-image frame data being currently preserved by the projector. Subsequently, since the current-image data generated by the current-image generation unit and the latest image data are compared with each other, part of the latest image data that is modified from the image data equal to the current-image data preserved by the projector is detected as a modified part.

In the present invention, it is preferable that the entire shape-converted, color-tone-corrected image data is transmitted from the information processing apparatus to the projector in predetermined timing.

When the modified-image data is transmitted from the information processing apparatus to the projector, there occurs a difference between the image data preserved in the information processing apparatus and the projector. Accordingly, it is preferable that the entire image data is transmitted from the information processing apparatus to the projector in an appropriate timing so that the image data preserved in the information processing apparatus and the projector can be matched with each other.

According to another aspect of the present invention, there is provided a method of generating modified-image data transmitted from an information processing apparatus to a projector in a projection system including the information processing apparatus that carries out image processing on an image of an image source in which color tone of each pixel is represented with a predetermined amount of information, the projector that projects an image based on an image data signal outputted from the information processing apparatus, and a signal transmission unit that carries signals between the information processing apparatus and the projector, the method including: comparing latest image data with preceding image data, and detecting, as a modified part, part of the latest image data that is modified from the preceding image data; and generating converted-image data of the modified part by adding color-tone data to each pixel in the modified part detected by the operation of detecting as a modified part, where the operation of detecting as a modified part detects the modified part with an accuracy of not more than the amount of information indicating the color tone of each pixel of the image source.

In the above-mentioned configuration, it is possible to appropriately display the image by maintaining the frame rate by the appropriate modified-image data transmitted from the information processing apparatus.

In the present invention, it is preferable that the above-mentioned method includes performing color-tone correction of the image data according to color characteristics of the projector, where the operation of detecting as a modified part detects the modified part by comparing image data with each other prior to being color-tone-corrected by the operation of performing color-tone correction of the image data.

In the above-mentioned configuration, since the modified part is detected by comparing the image data with each other that is not color-tone-corrected before the amount of information of color tone increases by color-tone correction, it is possible to appropriately detect the modified part of the image source.

In the present invention, it is preferable that the above-mentioned method includes performing color-tone correction of the image data according to color characteristics of the projector, where the operation of detecting as a modified part compares image data with each other that are color-tone-corrected in the operation of performing color-tone correction, and detects the modified part with an accuracy of not more than the amount of information indicating the color tone after color-tone correction.

In the above-mentioned configuration, since the modified part is detected with an accuracy of not more than the amount of information indicating the color tone after color-tone correction, it detects, as a modified part, only a pixel of which color tone has changed by more than a predetermined amount. Accordingly, it is possible to obtain an appropriate amount of the modified-image data without detecting an excessive number of pixels as the modified part. As a result, it is possible to appropriately maintain the frame rate on the projector without depending on the transmission rate by the signal transmission unit.

According to another aspect of the present invention, there is provided a modified-image data generation program that executes the above-mentioned method of generating the modified-image data on the information processing apparatus.

According to another aspect of the present invention, there is provided a recording medium that stores the above-mentioned modified-image data generation program.

For example, after CPU or memory unit is provided in the information processing apparatus so that it can act as a computer, programs are installed into the memory unit through communication means such as Internet, or recording medium such as CD-ROM, or memory card, and then CPU is operated by the programs to execute individual processes. The programs can be installed through the memory card or CD-ROM that is provided internally or externally. In addition, the programs can be installed through LAN cables or telephone lines or through wireless connection to communication network.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the present invention will be described in detail with reference to the accompanying drawings.

First Embodiment

A projection system according to a first embodiment of the invention will be described with reference to FIGS. 1 to 13.

Figure 1:
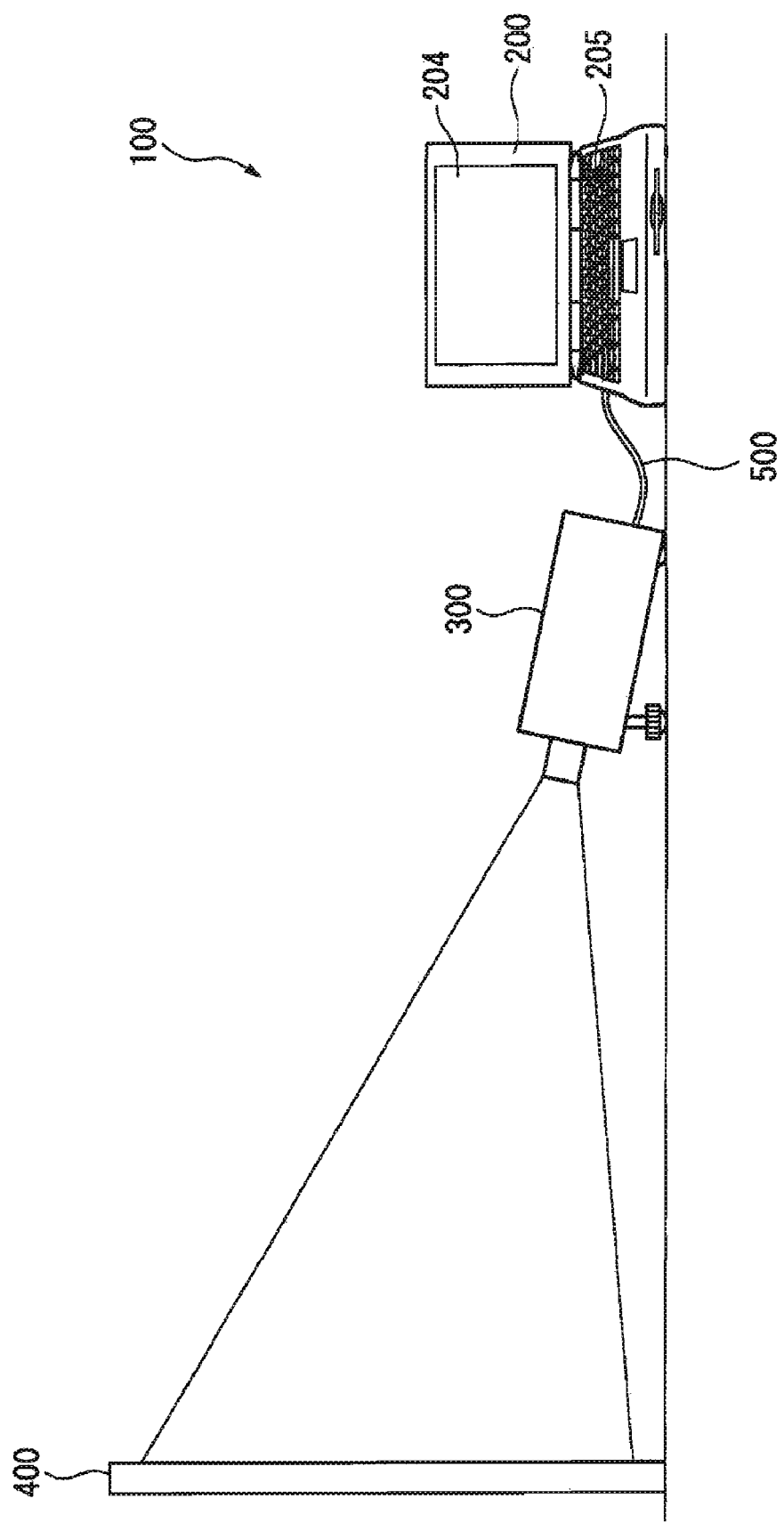
FIG. 1 is a projection system according to a first embodiment of the invention.

FIG. 1 illustrates a projection system 100 according to the first embodiment of the invention.

The projection system 100 includes a PC 200, a projector 300, and a USB cable 500. The PC 200 performs image processing on an image of an image source and outputs differential data of previous image frame to the projector 300. The projector 300 generates current-image frames based on the differential data outputted from the PC 200 and projects the current-image frames towards a screen 400. The USB cable 500 is used to connect the projector 300 and the PC 200 to each other.

Figure 2:
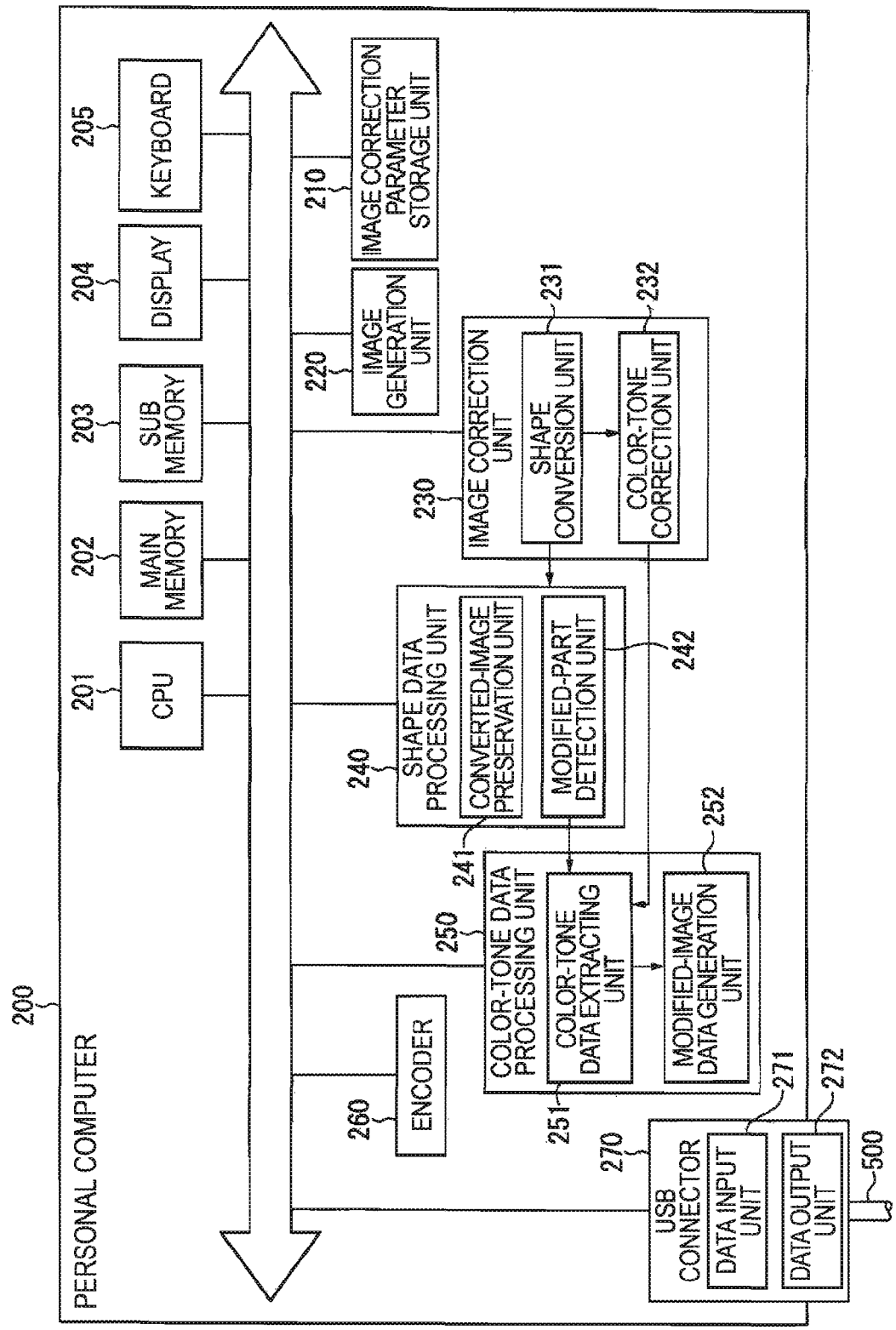
FIG. 2 is a block diagram of a PC according to the first embodiment of the invention.
Figure 3:
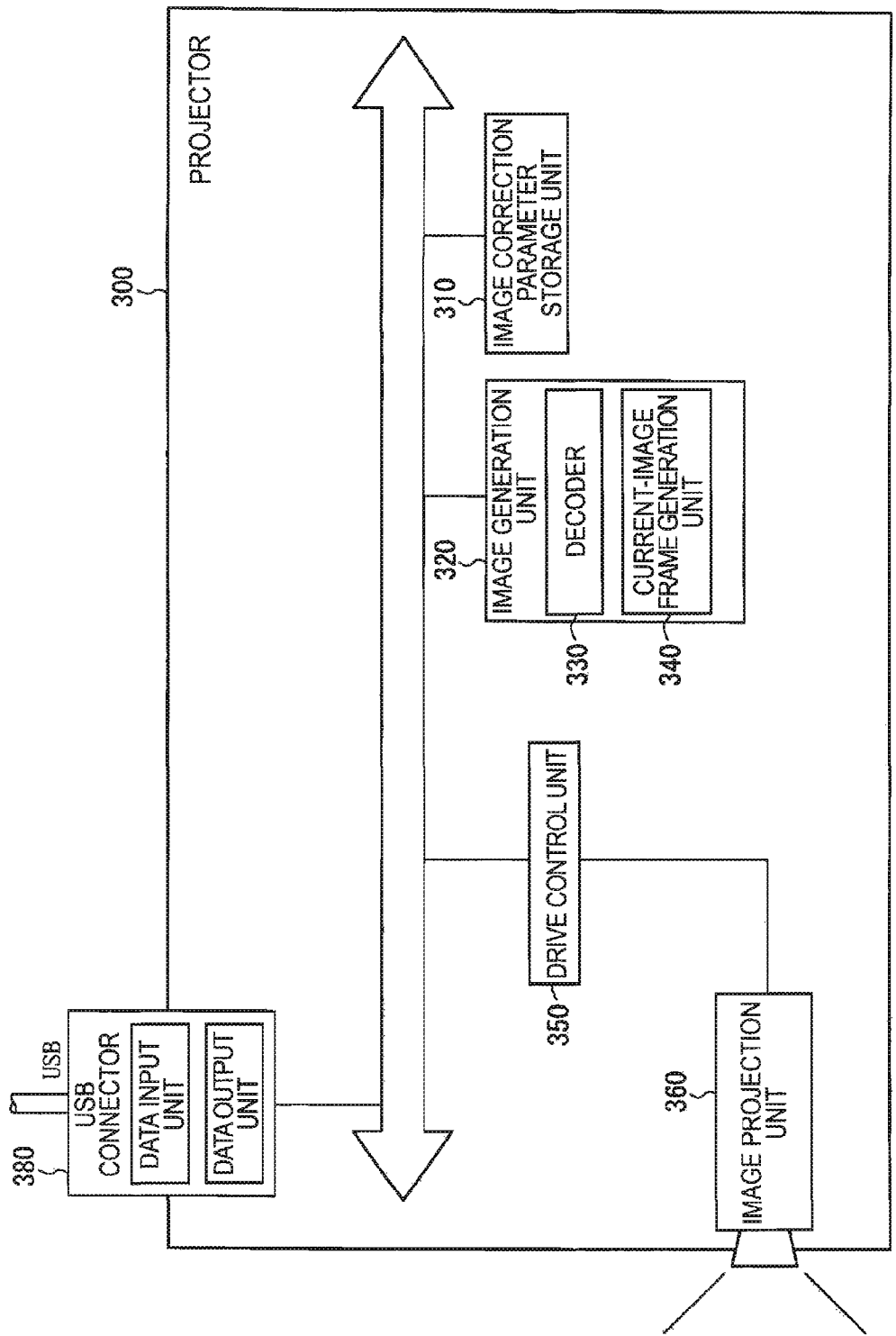
FIG. 3 is a block diagram of a projector according to the first embodiment of the invention.
Figure 4:
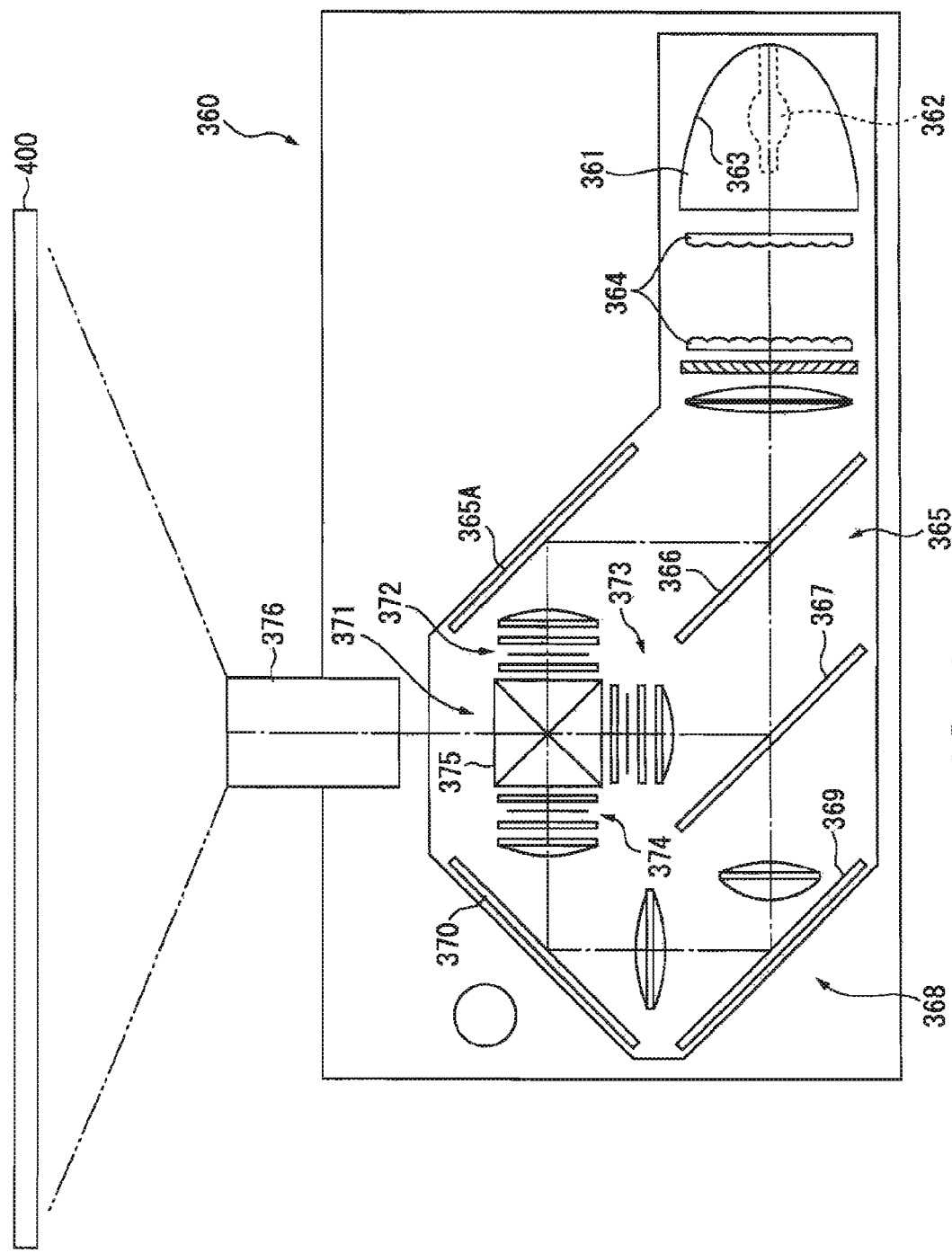
FIG. 4 is an image projection unit according to the first embodiment of the invention.

FIG. 2 is a block diagram of the PC 200. FIG. 3 is a block diagram of the projector 300. FIG. 4 is an image projection unit 360.

As shown in FIG. 2, the PC 200 includes a CPU 201, a main memory 202, a sub memory 203, a display 204, a keyboard 205, an image correction parameter storage unit 210, an image generation unit 220, an image correction unit 230, a shape data processing unit 240, a color-tone data processing unit 250, an encoder 260, and a USB connector 270.

The sub memory 203 is an image source media, such as DVD (digital versatile disk) storing digital data of images and voice. The image correction parameter storage unit 210 stores correction parameters to correct images based on characteristics of the projector 300. Examples of the parameters stored in the image correction parameter storage unit 210 include parameters used for trapezoid correction, unevenness of luminance, unevenness of color, and γ correction.

A memory card or CD-ROM storing the parameters may be inserted to the PC 200 to install the parameters in the image correction parameter storage unit 210.

When the PC 200 and the projector 300 are connected to each other via the USB cable 500, the PC 200 may read the parameters from the projector 300 and store the parameters in the image correction parameter storage unit 210.

The image generation unit 220 resolves an image source from the sub memory 203 according to its recording method and decodes image frame data one by one, thereby obtaining image data having, for example, 8-bit color information (RGB colors) with respect to each pixel.

The image correction unit 230 includes a shape conversion unit 231 and a color-tone correction unit 232. The shape conversion unit 231 carries out shape correction, such as trapezoid correction (see FIG. 6), with respect to the image data.

The trapezoid correction implies that when an upper side is elongated relative to a lower side since the upper side is longer in projection length than the lower side due to relative arrangement between the projector 300 and the screen 400 as shown in FIG. 1, it is corrected to the shape of image data beforehand so that the protected image can be properly shaped on the screen 400.

In addition to a case where the projector 300 is placed at the lower side of the screen 400 as shown in FIG. 1, the trapezoid correction is required in a case where an image is projected in an inclined direction with respect to the screen 400. Further, the shape correction is required in a case where the screen 400 has a curved surface or where a distortion in shape occurs due to a lens incorporated in the projector 300.

The color-tone correction unit 232 corrects color information of image data according to color characteristics of the projector 300. For instance, the color-tone correction unit 232 carries out color conversion, γ correction, VT-γ correction, or unevenness of color correction with respect to the image data. For instance, 8-bit color information is corrected to 10-bit color information or more.

The shape data processing unit 280 includes a converted-image preservation unit 241 and a modified-part detection unit 242. The converted-image preservation unit 241 stores in turn the image data that is shape-corrected by the shape conversion unit 231. Only a few latest frames of converted image data stored in the converted-image preservation unit 241 are required, and older frames of the converted image data are removed in turn.

The modified-part detection unit 242 compares latest converted-image data, which is shape-corrected by the shape conversion unit 231, with preceding converted-image data, which is preserved in the converted-image preservation unit 241, to detect a modified part.

The color-tone data processing unit 250 includes a color-tone data extracting unit 251 and a modified-image data generation unit 252. The color-tone data extracting unit 251 extracts color information of each pixel in the modified part detected by the modified-part detection unit 242 from image data that is color-tone-corrected by the color-tone correction unit 232. The modified-image data generation unit 252 generates image data of the modified part by adding color information to each pixel in the modified part.

An encoder 260 encodes the image data of the modified part generated by the modified-image data generation unit 252. A USB connector 270 includes a data input unit 271 and a data output unit 272, and exchanges data with the projector 300 via the USB cable 500.

As shown in FIG. 3, the projector 300 includes an image correction parameter storage unit 310, an image generation unit 320, a drive control unit 350, an image projection unit 360, and a USB connector 380. The image correction parameter storage unit 310 stores correction parameters to correct images based on characteristics of the projector 300. Examples of the correction parameters include parameters for trapezoid correction, unevenness of luminance, unevenness of color, and γ correction.

The image generation unit 320 includes a decoder 330 and a current-image frame generation unit 340. The decoder 330 demodulates a modified-image data signal transmitted from the PC 200. That is, since the modified-image data signal from the PC 200 is encoded by the encoder 260, it is demodulated by the decoder 330 into image data of the modified part.

The current-image frame generation unit 340 generates a new current-image frame by synthesizing image frame data being currently projected with the image data of the demodulated modified part.

The drive control unit 350 outputs a control signal to drive the image projection unit 360 so that the current-image frame can be displayed.

As shown in FIG. 4, the image projection unit 360 includes a light-source unit 361. Light emitted from a light source 362 becomes parallel light components by a reflector 363, and transmits to a dichroic optical system 365 through two sheets of lens arrays 364.

The dichroic optical system 365 includes a dichroic mirror 366 which reflects red color but transmits blue and green colors, and a dichroic mirror 367, which reflects green color but transmits blue color, such that it divides the light into red, green and blue color components. The red and green color components are reflected by a reflective mirror 365A and a dichroic mirror 306, respectively, and the blue color component is introduced to a relay optical system 368 having two sheets of reflective mirrors 369 and 370, and they are transmitted to liquid crystal panels 372, 373 and 374 for red, green and blue colors, respectively, of an electro-optical device 371. The color components are modulated on the respective liquid crystal panels 372 to 374 according to image information, and synthesized by a prism 375.

The synthesized image is emitted from a projection optical system 376 and is projected to the screen 400.

Figure 5:
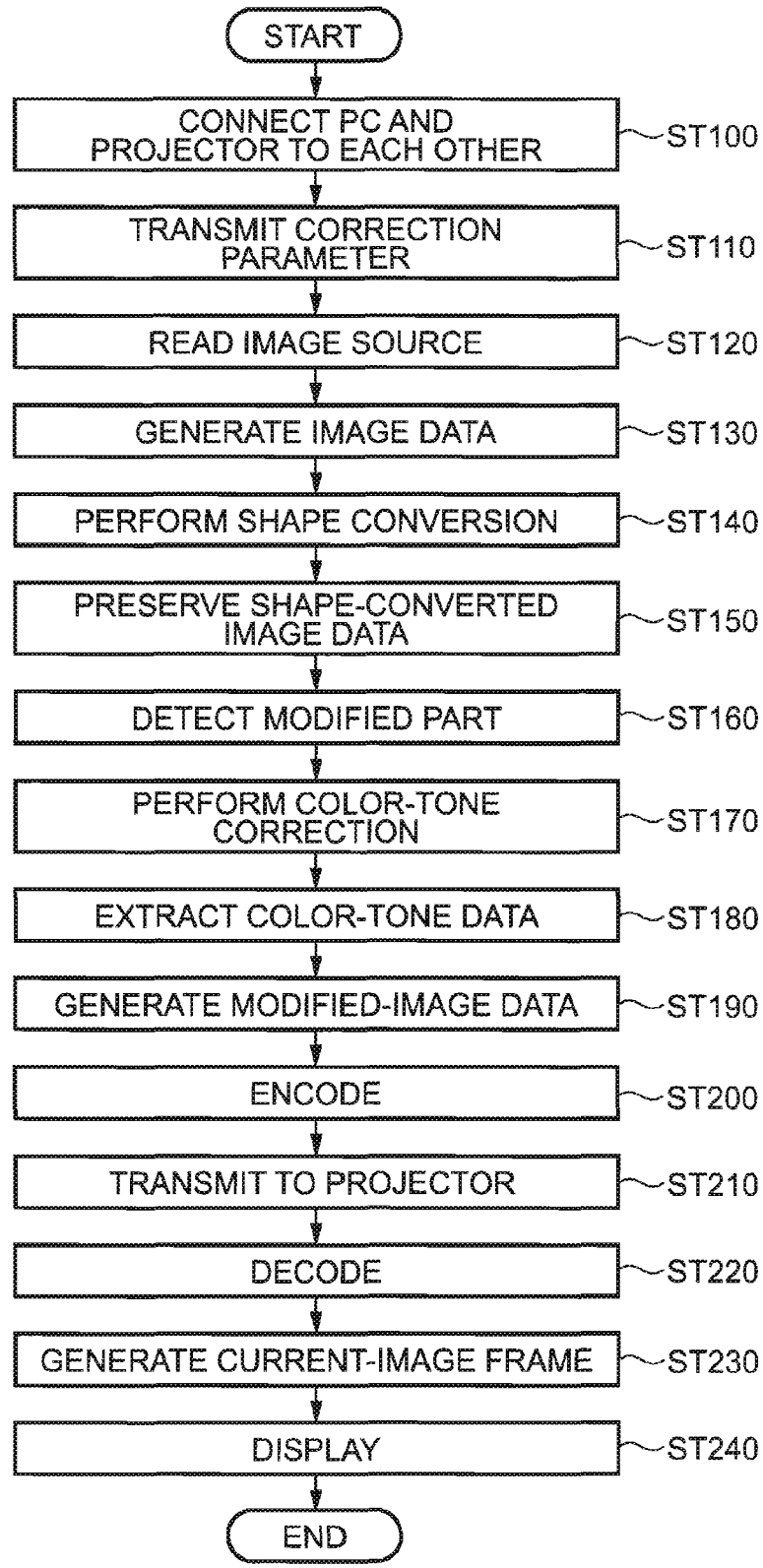
FIG. 5 is a flow chart of a method of projecting an image source from a projector according to the first embodiment of the invention.

Next, a method of projecting an image source from the projector 300 will be described with reference to a flow chart of FIG. 5 and images shown in FIGS. 6 to 13.

At step ST100, the PC 200 and the projector 300 are connected to each other by the USB cable 500. At step ST110, correction parameters stored in the image correction parameter storage unit 310 of the projector 300 are transmitted to the PC 200 via the USB cable 500 and stored in the image correction parameter storage unit 210 of the PC 200.

At step ST120, an image source is read from a DVD of the sub memory 203. At step ST130, the image generation unit 220 generates image data by performing decoding or IP converting of the image source.

Figure 6:
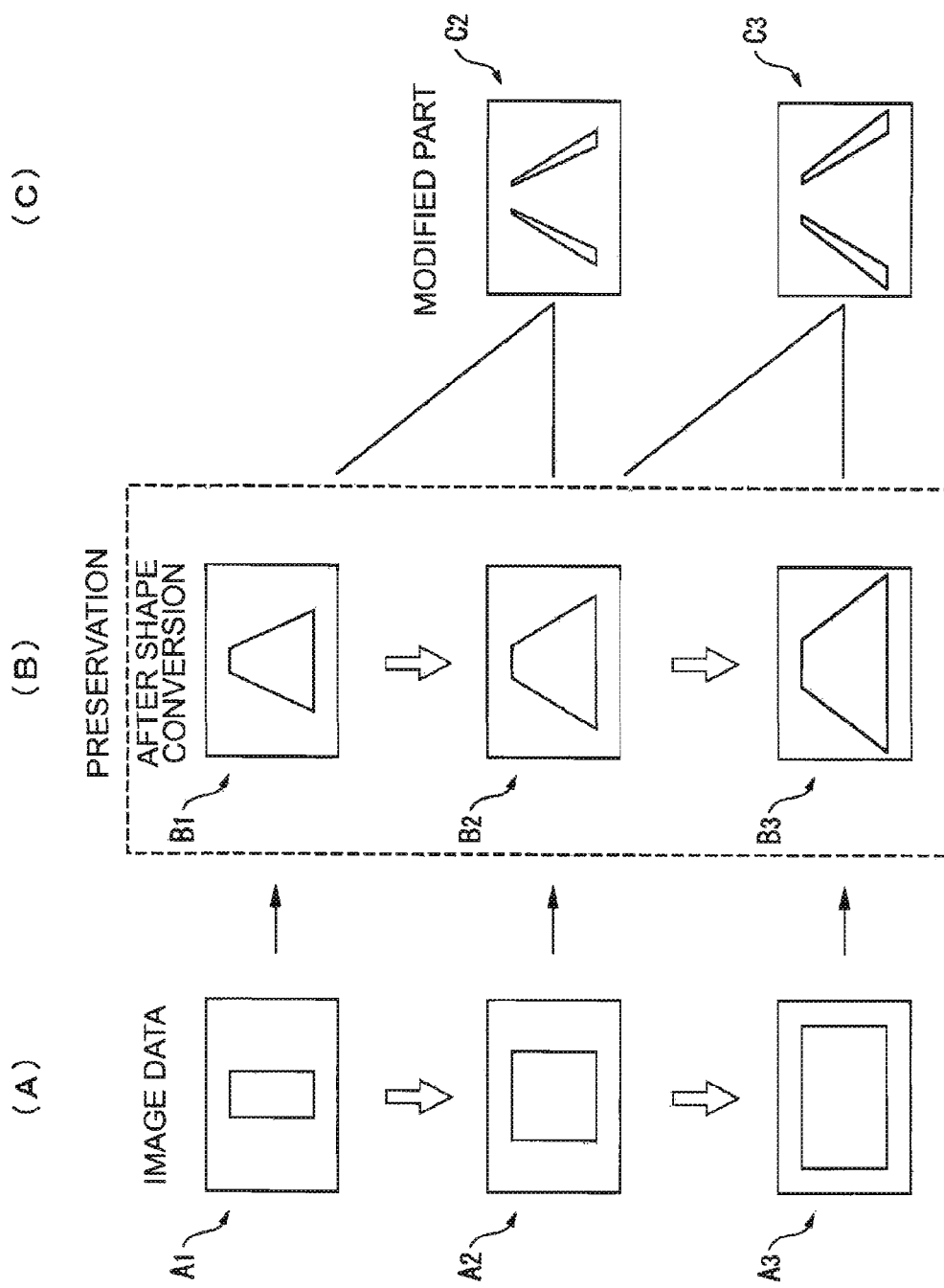
FIG. 6 illustrates a method of processing an image until an image source is projected from a projector according to the first embodiment of the invention.

For instance, the image source is a moving image in which a square becomes thicker in horizontal direction as shown in (A) in FIG. 6. That is, image data generated in the image generation unit 220 becomes image data in which a square becomes thicker like images A1, A2, A3 . . . shown in (A) in FIG. 6. The image data generated in the image generation unit 220 is sent to the shape conversion unit 231 in the order of images A1, A2, and A3.

At step ST140, the shape conversion unit 231 carries out shape conversion of the image data. Trapezoid correction will be described with reference to (B) in FIG. 6. In this case, it is assumed that an image is shape-converted in the order of images A1, A2 and A3, image A1 is converted to image B1, image A2 to image B2, and image A3 to image B3.

At step ST150, the shape-converted image data is preserved in the converted-image preservation unit 241. At the same time, the shape-converted image data B1 to B3 is sequentially sent to the modified-part detection unit 242. At step ST160, the modified-part detection unit 242 detects a different part between a latest image and a preceding image.

For instance, when the image A2 is shape-converted to the image B2 in the shape conversion unit 231, the image B2 is sent to the modified-part detection unit 242 and compared with the preceding image data B1, and a different part is detected between the images B1 and B2. For example, a part C2 is detected as a modified part when the image B1 is converted to the image B2, a part C3 is detected as a modified part when the image B2 is converted to the image B3.

In connection with the detection of the modified part, a method of representing the amount of information per pixel in figure will be described.

Figure 9:
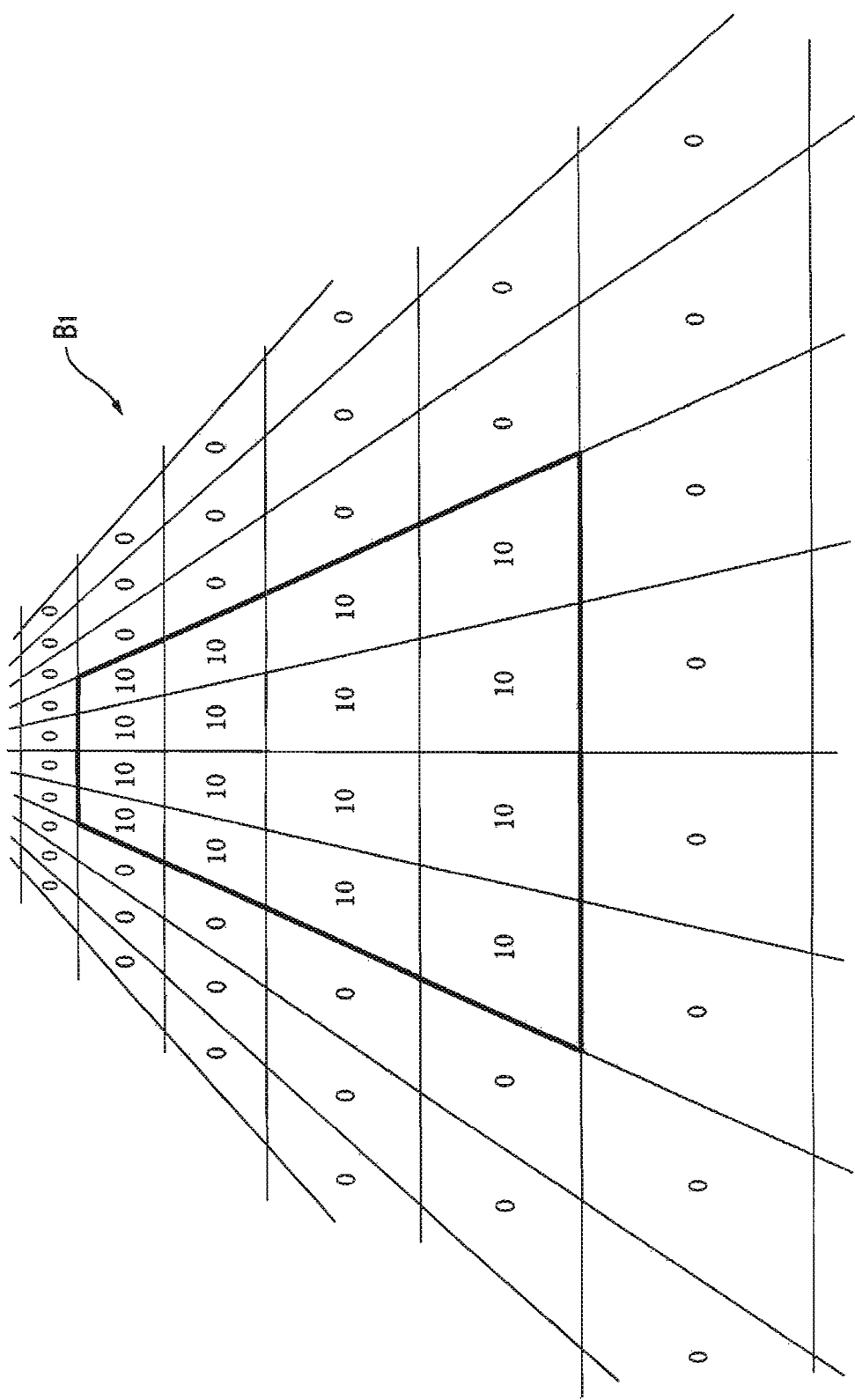
FIG. 9 illustrates the amount of information per pixel that is represented in figure to explain image processing according to the first embodiment of the invention.
Figure 10:
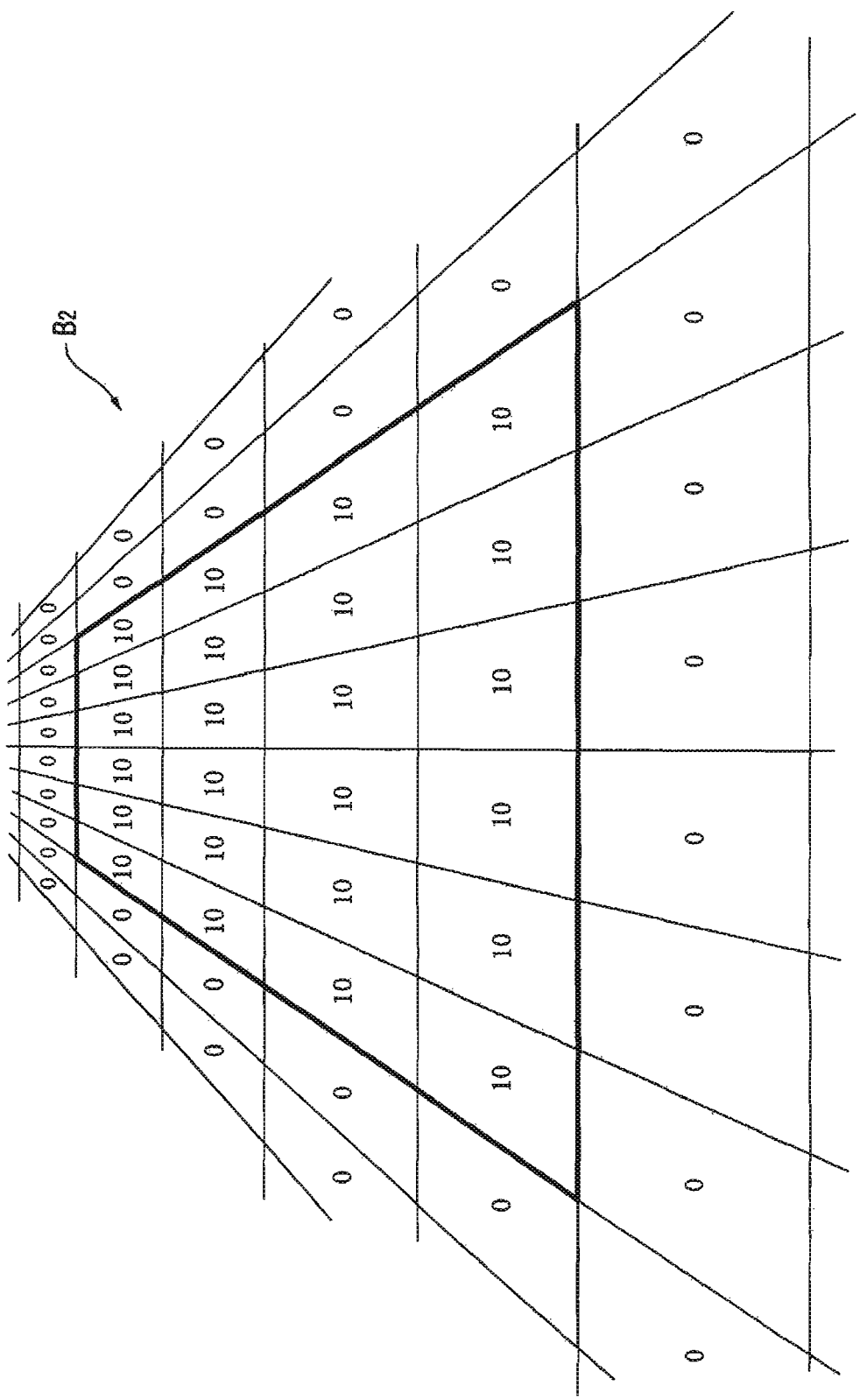
FIG. 10 illustrates the amount of information per pixel that is represented in figure to explain image processing according to the first embodiment of the invention.

For instance, it is assumed that image data B1 shown in FIG. 9 is obtained by performing shape correction of the image A1, and image data B2 shown in FIG. 10 is obtained by performing shape correction of the image A2.

Figure 11:
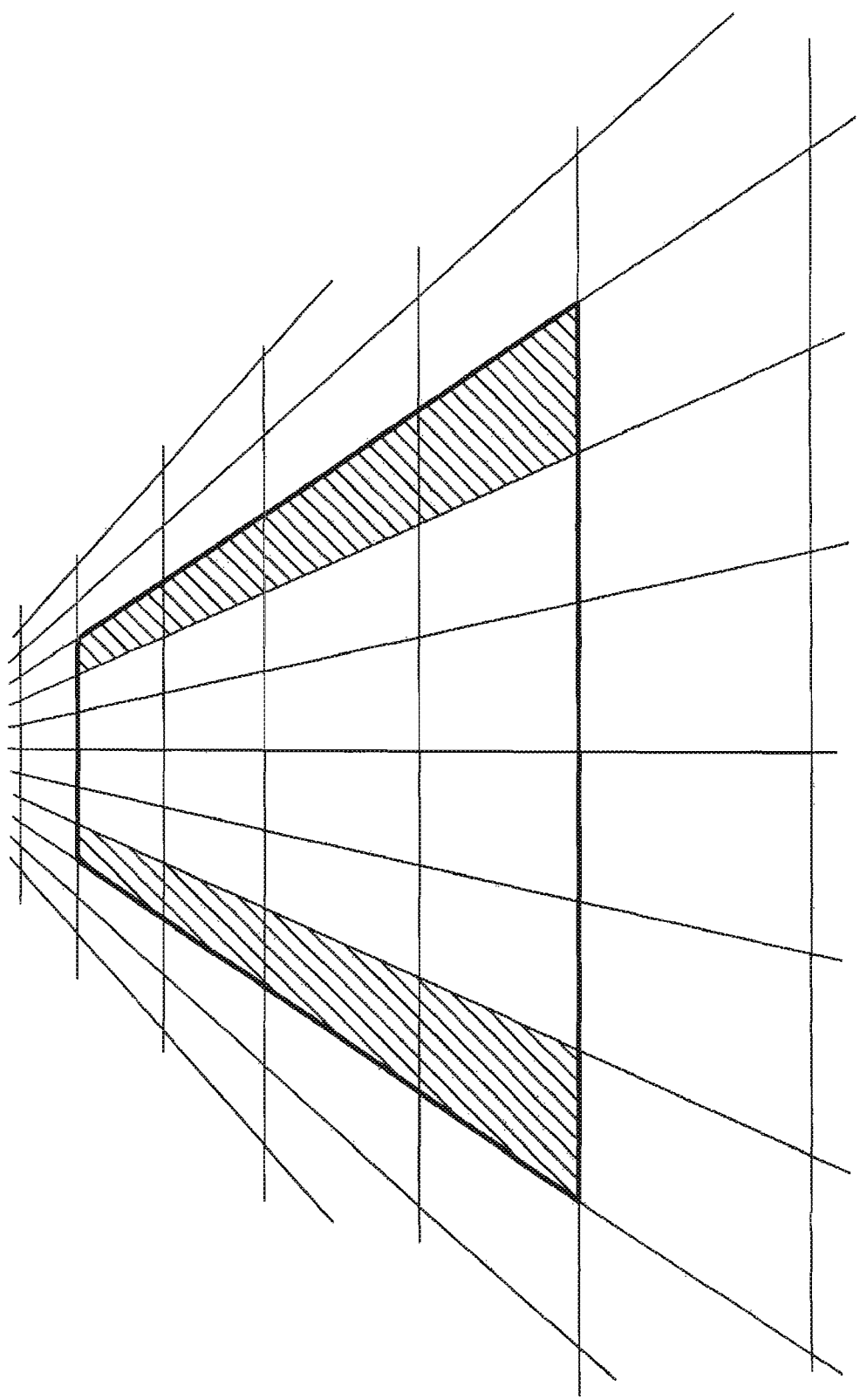
FIG. 11 illustrates the amount of information per pixel that is represented in figure to explain image processing according to the first embodiment of the invention.
Figure 12:
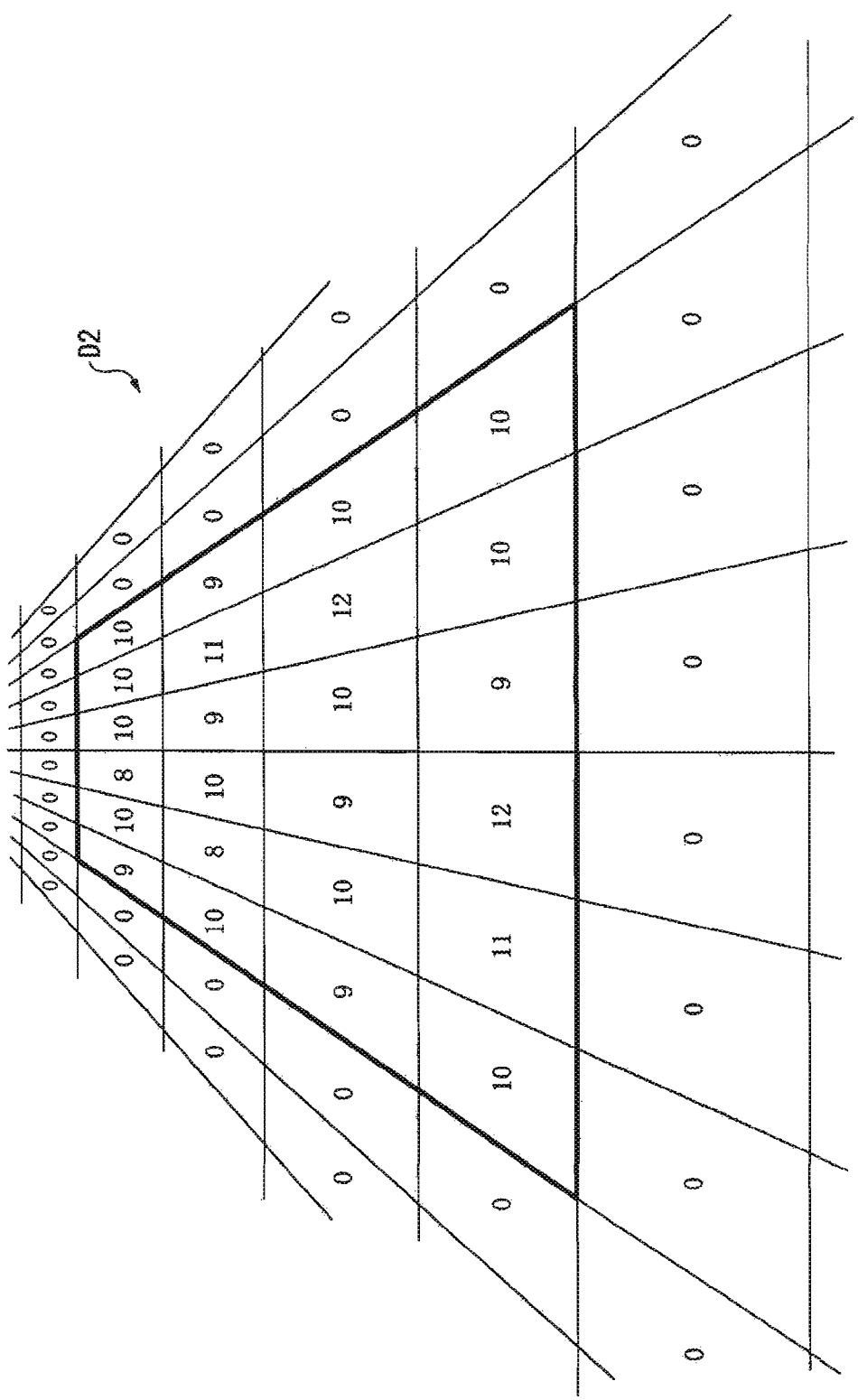
FIG. 12 illustrates the amount of information per pixel that is represented in figure to explain image processing according to the first embodiment of the invention.

In this case, the image data is shape-corrected but has the same 8-bit color data of each pixel as the original image source data. When detecting a modified part between the images B1 and B2, the modified-part detection unit 242 subtracts the color data of each pixel to an accuracy of 8 bits and detects pixels having a difference. As a result, as shown in FIG. 11, parts that are modified from the image B1 to the image B2 are detected.

Figure 7:
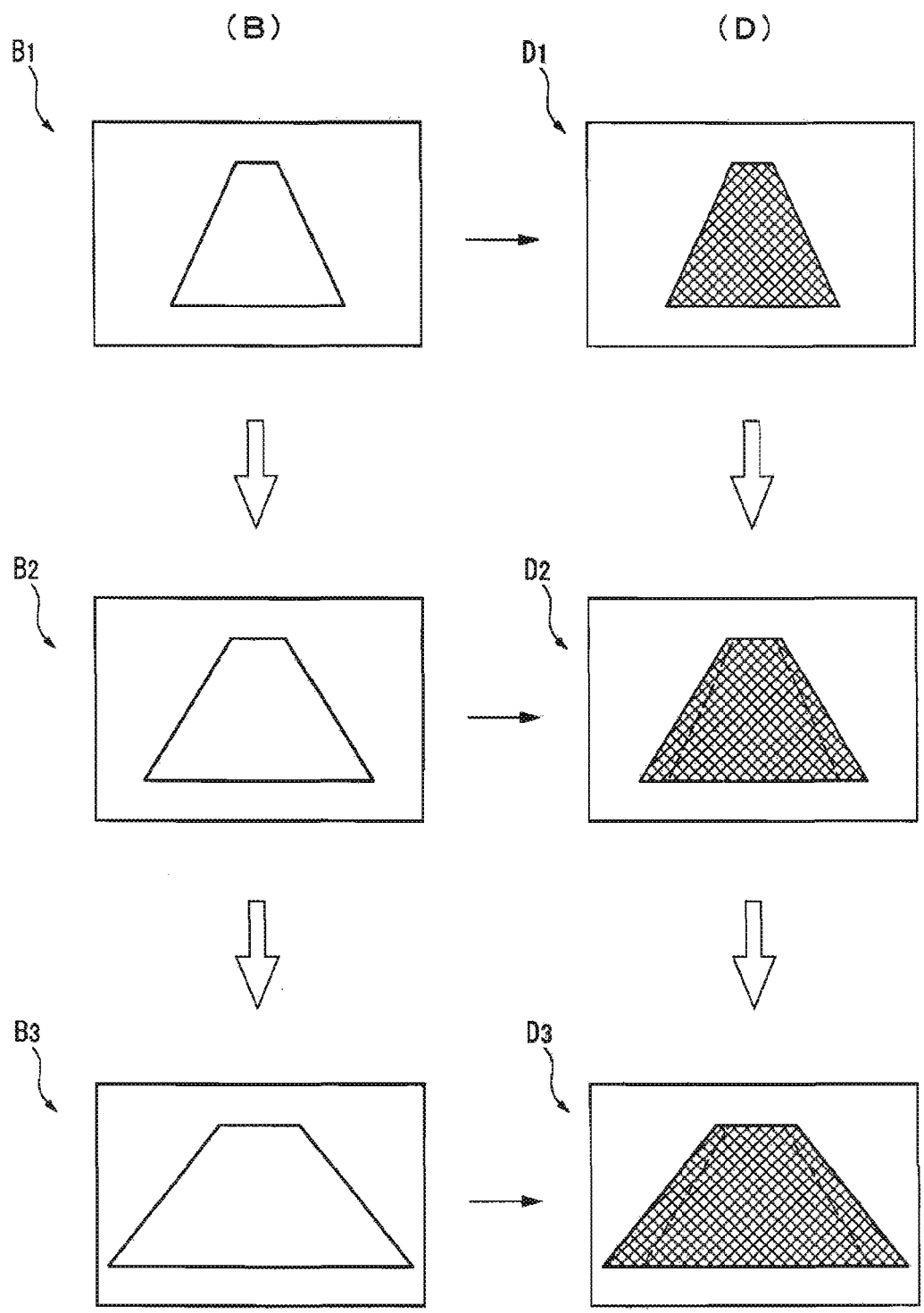
FIG. 7 illustrates a method of processing an image until an image source is projected from a projector according to the first embodiment of the invention.
Figure 8:
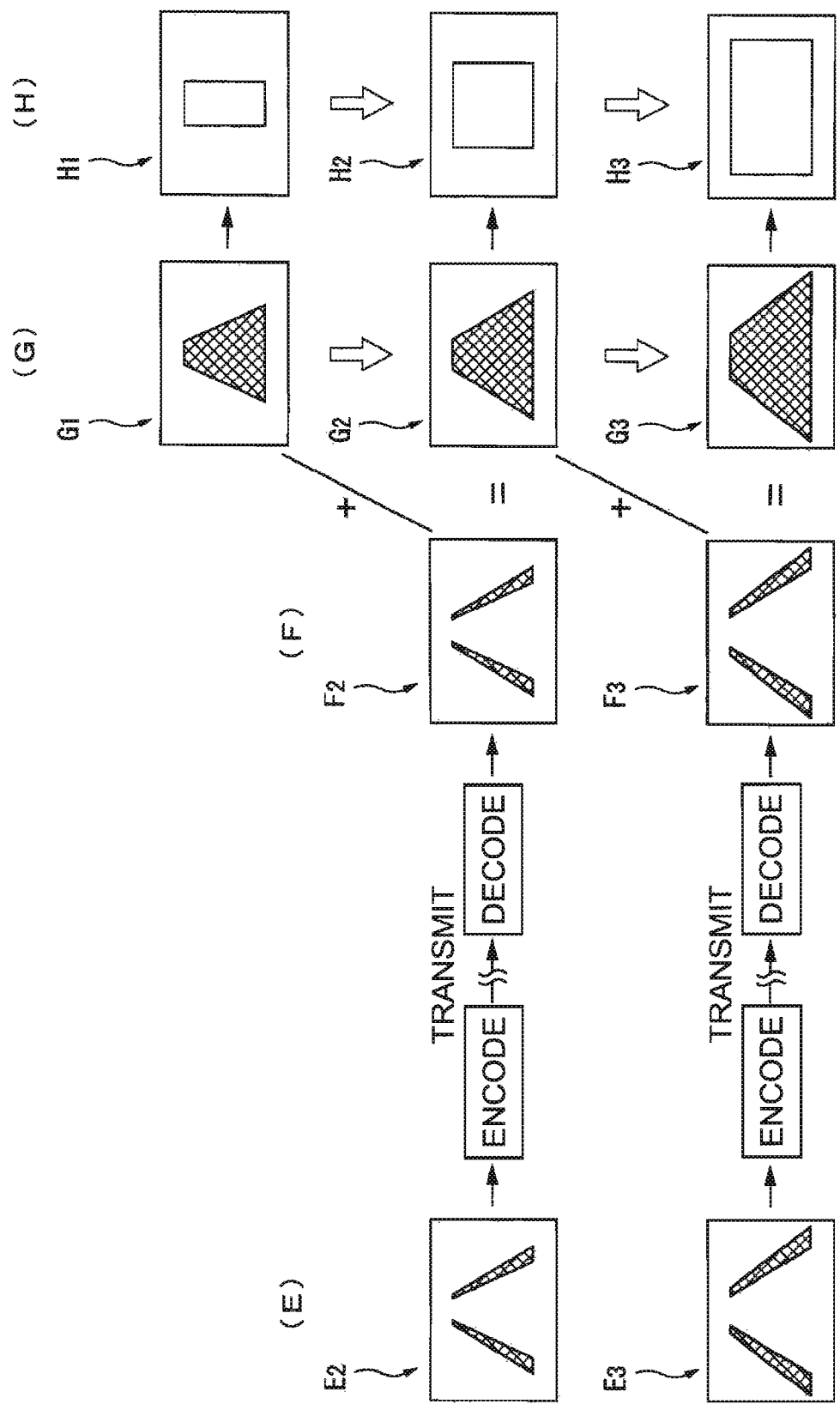
FIG. 8 illustrates a method of processing an image until an image source is projected from a projector according to the first embodiment of the invention.

At step ST170, the color-tone correction unit 232 carries out color-tone correction of the image data B1 to B3 (see FIG. 7). That is, the image data B1 to B3 that is shape-converted in the shape conversion unit 231 is sequentially sent to the color-tone correction unit 232. For instance, it is assumed that the shape-converted image data B1 is color-tone-corrected to image D1, the image data B2 to image D2, the image data B3 to image D3.

In this case, while the original image source represents the color tone of each pixel with an information amount of 8 bits, the color tone is represented with an accuracy of 10 bits by performing color-tone correction. For example, the image data D2 shown in FIG. 12 can be obtained by performing color-tone correction of the image B2.

At step ST180 the color-tone data extracting unit 251 extracts color-tone data of each pixel in the modified parts C2 and C3.

In this case, the modified-part detection unit 242 detects the modified parts C2 and C3 between the preceding image and the current image, but does not detect color information in the modified parts. The color-tone data extracting unit 251 compares color-tone-converted image data D1 to D3 with the modified parts C2 and C3 to detect pixels of the color-tone-converted images D1 to D3 corresponding to each pixel in the modified part and extract color-tone data from the color-tone-converted images D1 to D3.

Figure 13:
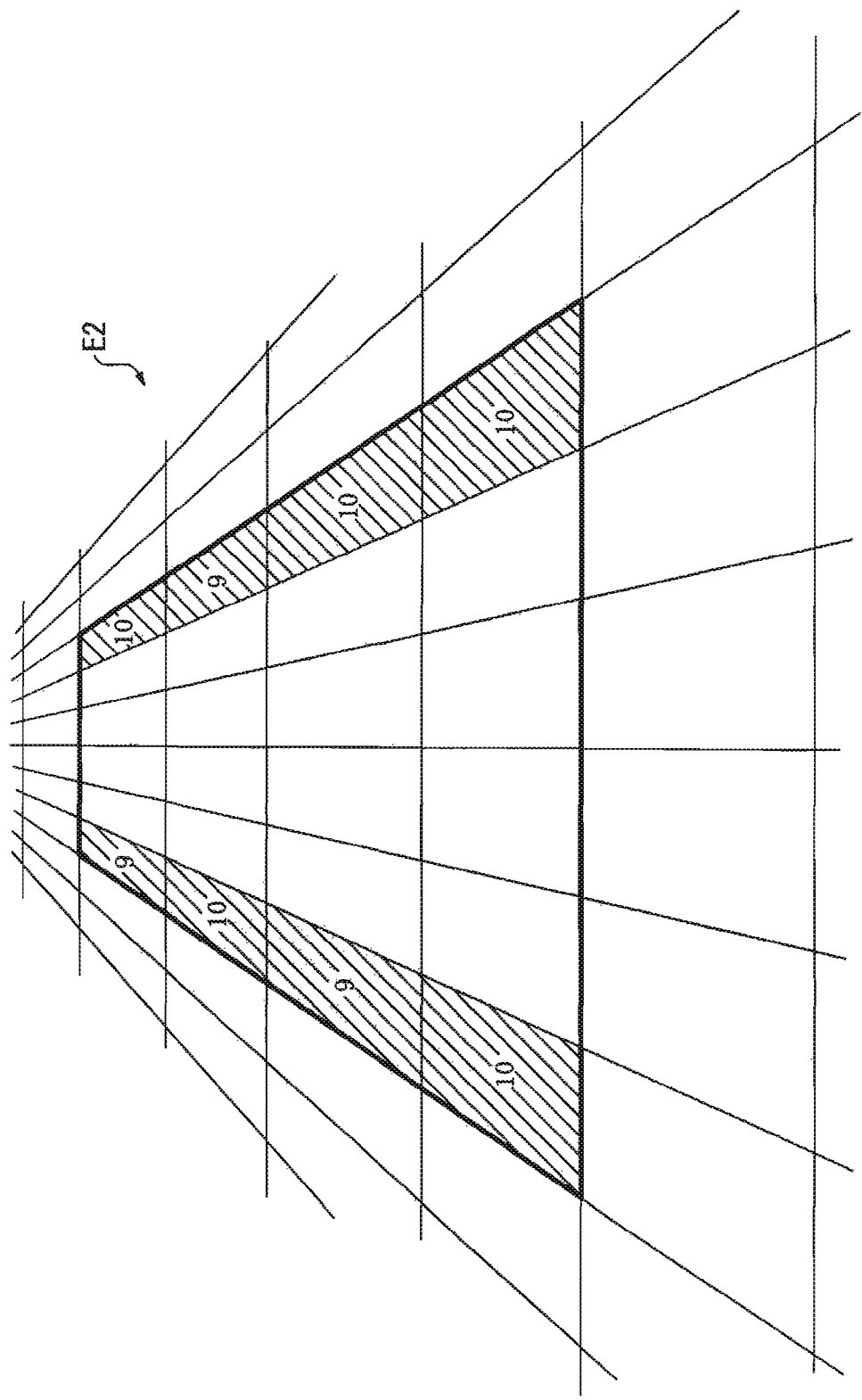
FIG. 13 illustrates the amount of information per pixel that is represented in figure to explain image processing according to the first embodiment of the invention.

At step ST190, the modified-image data generation unit 252 generates image data of the modified part having color information of each pixel of the modified part by adding color-tone data of each pixel extracted from the color-tone data extracting unit 251 to each pixel of the modified part. For instance, a modified image E2 is generated by adding color-tone information to the modified part C2, and a modified image E3 is generated by adding color-tone information to the modified part C3 (see FIG. 8). In more detail, for example, the color-tone data of pixel corresponding to the modified part C2 is extracted from the color-tone-corrected image D2 (FIG. 12), and the extracted color-tone data is added to each pixel. As a result, as shown in FIG. 13, the modified image E2 is generated in which the color-tone data is added to each pixel of the modified part.

At step ST200, the encoder 260 encodes the modified images E2 and E3 generated in the modified-image data generation unit 252. At step ST210, the encoded, modified images E2 and E3 are transmitted to the projector 300 via the USB cable 500.

At step ST220, the decoder 330 demodulates data signals of the modified images E2 and E3. For instance, it is assumed that the modified image E2 is demodulated into a modified image F2, and the modified image E3 into a modified image F3 (see FIG. 8).

At step ST230, the current-image frame generation unit 340 generates a next current-image frame by synthesizing the demodulated modified images F2 and F3 with the current-image frame data being currently projected. For example, when an image H1 is displayed on the screen 400 by projecting a current image G1 on the screen 400, a next current-image frame G2 is generated by synthesizing the current-image G1 with the modified image F2. Similarly, when an image H2 is displayed on the screen 400 by projecting the current image G2 on the screen 400, a next current-image frame G3 is generated by synthesizing the current-image G2 with the modified image F3.

At step ST240, current images are sequentially projected on the screen 400.

In more detail, the drive control unit 350 outputs a control signal to the image projection unit 360 so that the current images G1 to G3 generated in the current-image frame generation unit 340 can be displayed. The images projected from the image projection unit 360 are displayed on the screen 400.

Accordingly, the first embodiment has the following effects: (1) Since the PC 200 carries out image processing, such as shape conversion, and transmits image data signals to the projector 300, the projector 300 needs not to have complex functions for image processing, thereby simplifying the construction of projector 300. That is, the projector 300 has a simple construction including the image generation unit 320 and the image projection unit 360, such that the projector 300 becomes compact and inexpensive.

(2) The PC 200 originally has a graphic function, shape-correction function, and color-tone-correction function. Accordingly, the PC 200 has only to have necessary parameters without providing additional image processing functions.

In addition, the PC 200 having graphic function can perform high-speed and accurate image processing.

(3) Since the PC 200 transmits to the projector 300 the modified-image data containing the modified part and color-tone data of the modified part, it is possible to significantly reduce the amount of data to be transmitted, for example, compared to a case where all data constituting a single image frame are transmitted.

Accordingly, even though the USB cable 500 having a limited transmission rate is used, it is possible to maintain a proper frame rate on the projector 300 by transmitting a necessary amount of data at a predetermined rate.

(4) Since the PC 200 detects the modified part by comparing shape-converted image data converted in the shape conversion unit 231 with each other and detects a modified portion of the shape after processing, it is possible to properly detect the modified portion of shape. As a result, the projector 300 can generate the current-image frame data based on the modified image data to properly display the image.

(5) Since the modified image data has the modified part and color-tone data, it is not necessary to obtain the color information from differential data to generate the current-image frame data using the projector 300. Accordingly, it is possible to simplify the construction of projector 300.

(6) The modified-part detection unit 242 detects the modified part by comparing the image data with each other prior to performing color-tone correction. Once color-tone correction is carried out, 8-bit color information of each pixel is accurately corrected to an accuracy of 10 bits. Thus, when the image data are compared with each other after the color-tone correction, a large portion of the pixel may be detected to be modified. In this case, since the amount of information of the modified-image data becomes too large, it is difficult to maintain satisfactory transmission rate with the USB cable 500.

However, in the present embodiment, since the modified part is detected by comparing the image data with each other after shape conversion but prior to performing color-tone correction, it is possible to detect a change in each pixel with an accuracy of 8 bits and properly detect the modified part of the image source. Accordingly, it is possible to maintain an appropriate amount of information of the modified-image data.

Second Embodiment

Next, a second embodiment of the invention will be described with reference to FIGS. 14 to 22.

A basic construction of the second embodiment is similar to that of the first embodiment except that when a modified part is detected, color-tone-converted image data are compared with each other.

Figure 14:
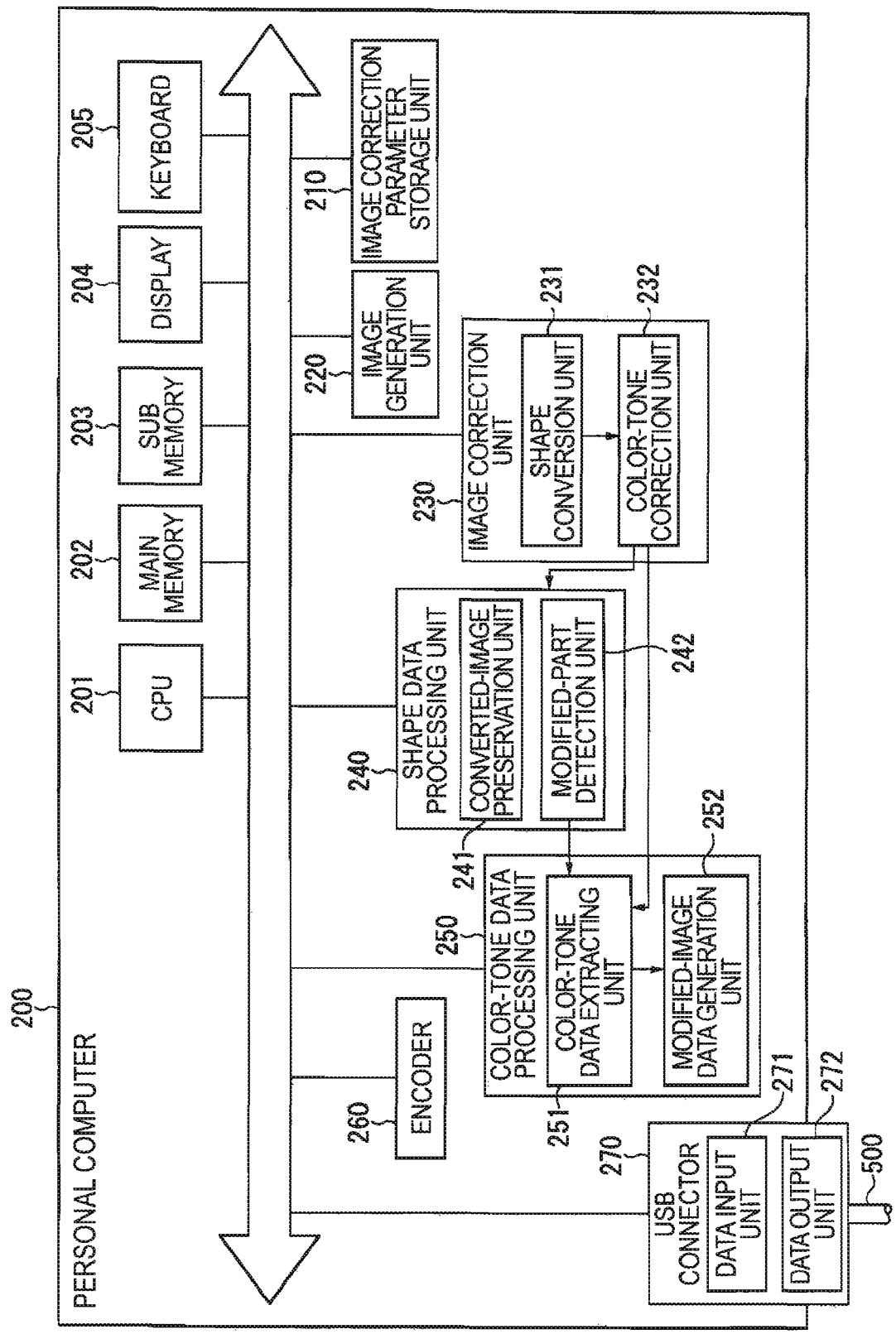
FIG. 14 is a block diagram of a PC according to a second embodiment of the invention.

FIG. 14 is a block diagram of the PC 200 according to the second embodiment of the invention.

Referring to FIG. 14, an image correction unit 230 includes a shape conversion unit 231 and a color-tone correction unit 232.

Similarly to the first embodiment, image data generated by the image generation unit 220 is shape-corrected (trapezoid corrected) in the shape conversion unit 231.

The image data that is shape-converted by the shape conversion unit 231 is transmitted to the color-tone correction unit 232, which corrects color-tone of the image data.

The image data that is color-tone-corrected by the color-tone correction unit 232 is transmitted to the shape data processing unit 240, and is preserved in the converted-image preservation unit 241.

The color-tone-corrected image data is transmitted to the modified-part detection unit 242. Latest color-tone-corrected image data and preceding image data preserved in the converted-image preservation unit 241 are compared with each other. A different part between the latest image and the preceding image is detected as a modified part.

According to the first embodiment, the converted-image preservation unit 241 preserves the image data that is shape-converted by the shape conversion unit 231, and the modified-part detection unit 242 detects the modified part by comparing the image data that are shape-converted by the shape conversion unit 231. However, according to the second embodiment, the modified part is detected by the image data that are shape-converted and then color-tone-corrected. When comparing the color-tone-corrected image data with each other, the modified-part detection unit 242 compares eight most significant bits among 10-bit color-tone data of each pixel to detect the modified part.

The color-tone data processing unit 250 is the same as that of the first embodiment in that the color-tone data extracting unit 251 extracts color information of each pixel in the modified part from the image data that is color-tone-corrected by the color-tone correction unit 232, and the modified-image data generation unit 252 generates image data of the modified part in which color information is added to each pixel of the modified part.

A method of projecting an image source from the projector 300 will be described with reference to a flow chart of FIG. 15 and images shown in FIGS. 16 to 21.

Figure 15:
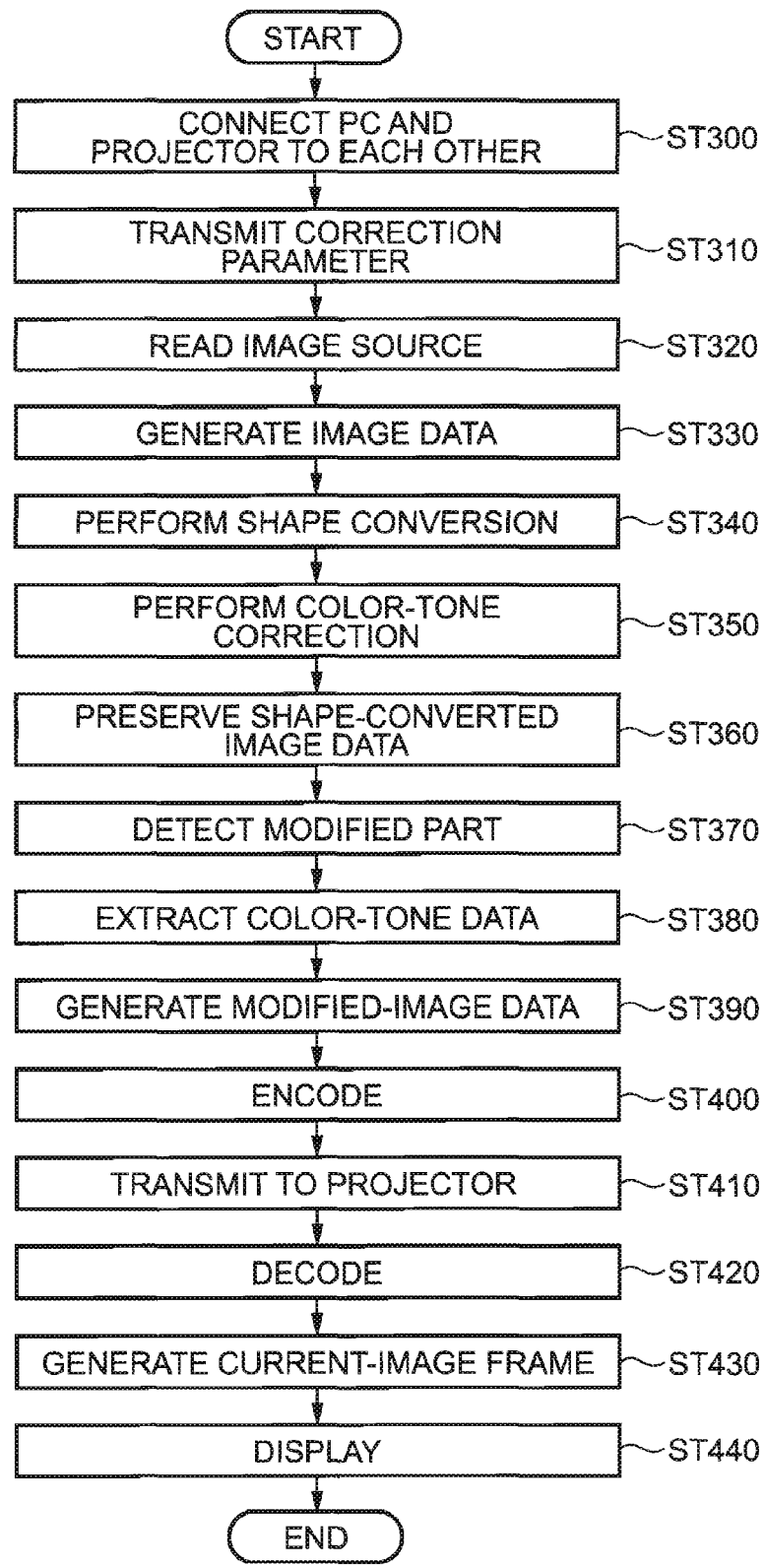
FIG. 15 is a flow chart of a method of projecting an image source from a projector according to the second embodiment of the invention.
Figure 16:
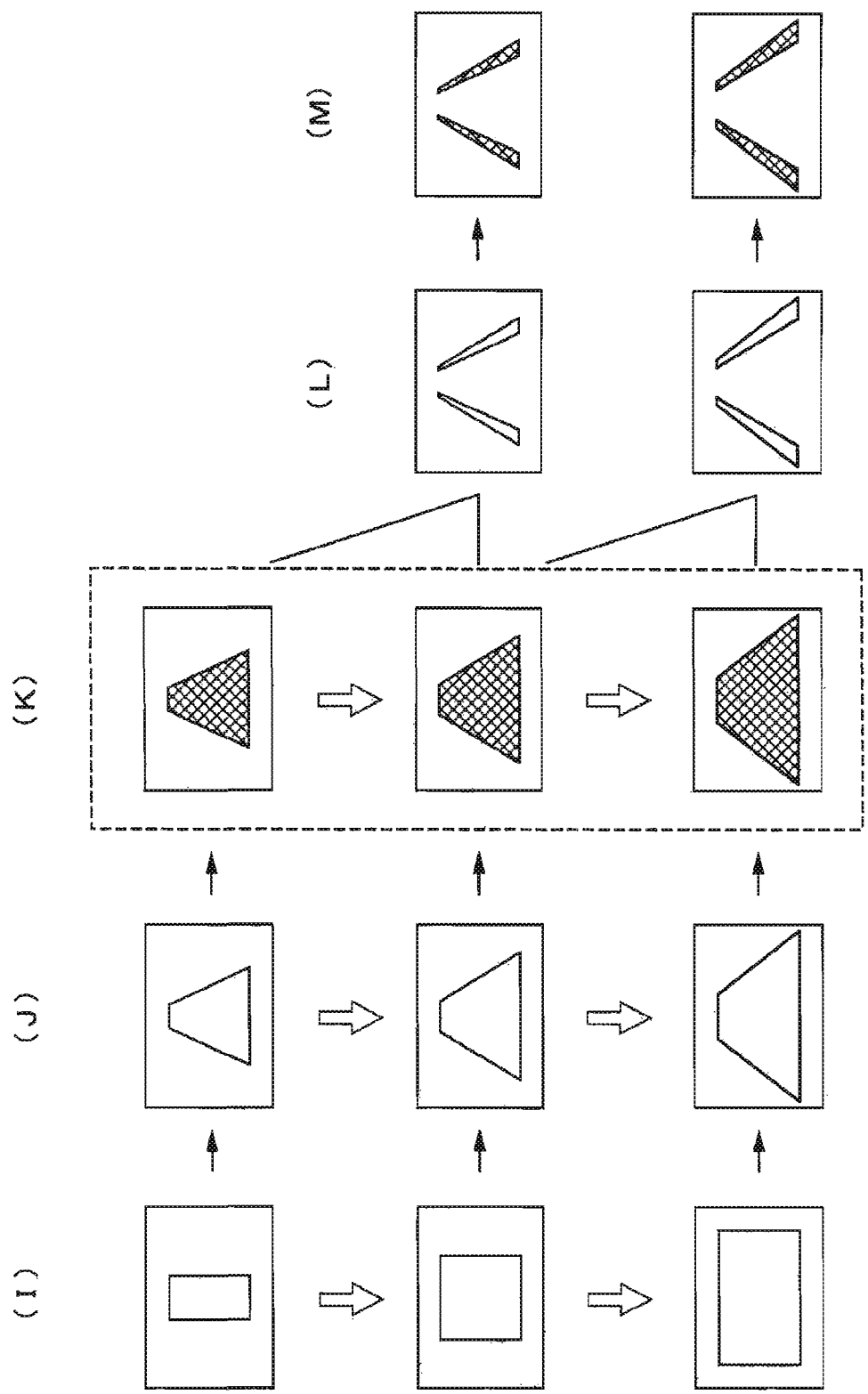
FIG. 16 illustrates a method of processing an image until an image source is projected from a projector according to the second embodiment of the invention.

In FIG. 15, steps ST300 to ST340 are the same as steps ST100 to ST140 of the first embodiment. That is, operation of performing trapezoid correction (J) of an image source (I) in FIG. 16 is the same as that of the first embodiment.

At step ST340, the shape conversion unit 231 carries out shape conversion. At step ST350, the color-tone correction unit 232 carries out color-tone correction. A shape-converted image J becomes a color-tone-corrected image K.

At step ST360, the color-tone-corrected image K is preserved in the converted-image preservation unit 241. At step ST370, the color-tone-converted image data is compared with a preceding color-tone-converted image, such that a modified-part is detected in the modified-part detection unit 242 ((L) in FIG. 16).

A method of representing the amount of information per pixel in figure will be described.

Figure 17:
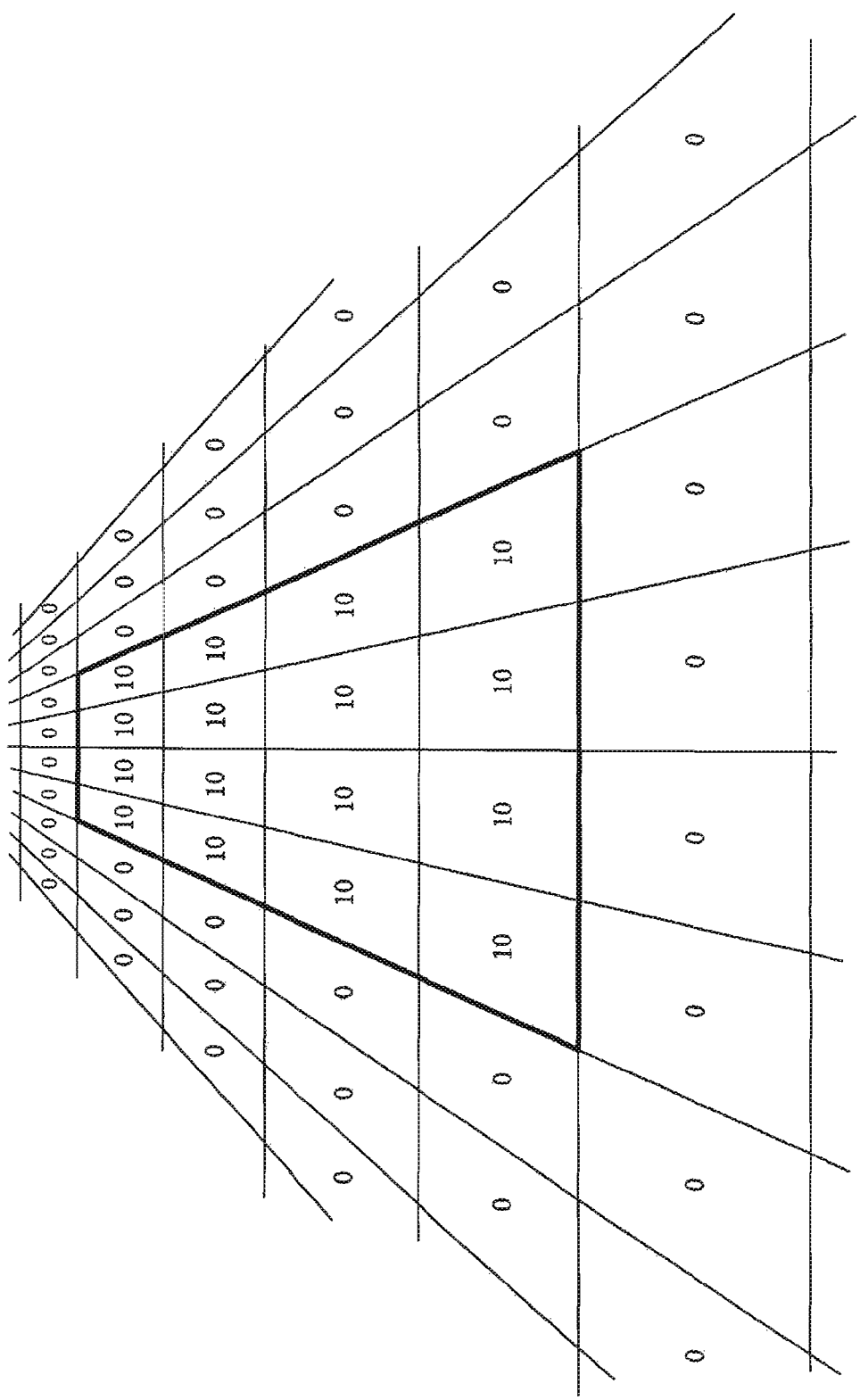
FIG. 17 illustrates the amount of information per pixel that is represented in figure to explain image processing according to the second embodiment of the invention.
Figure 18:
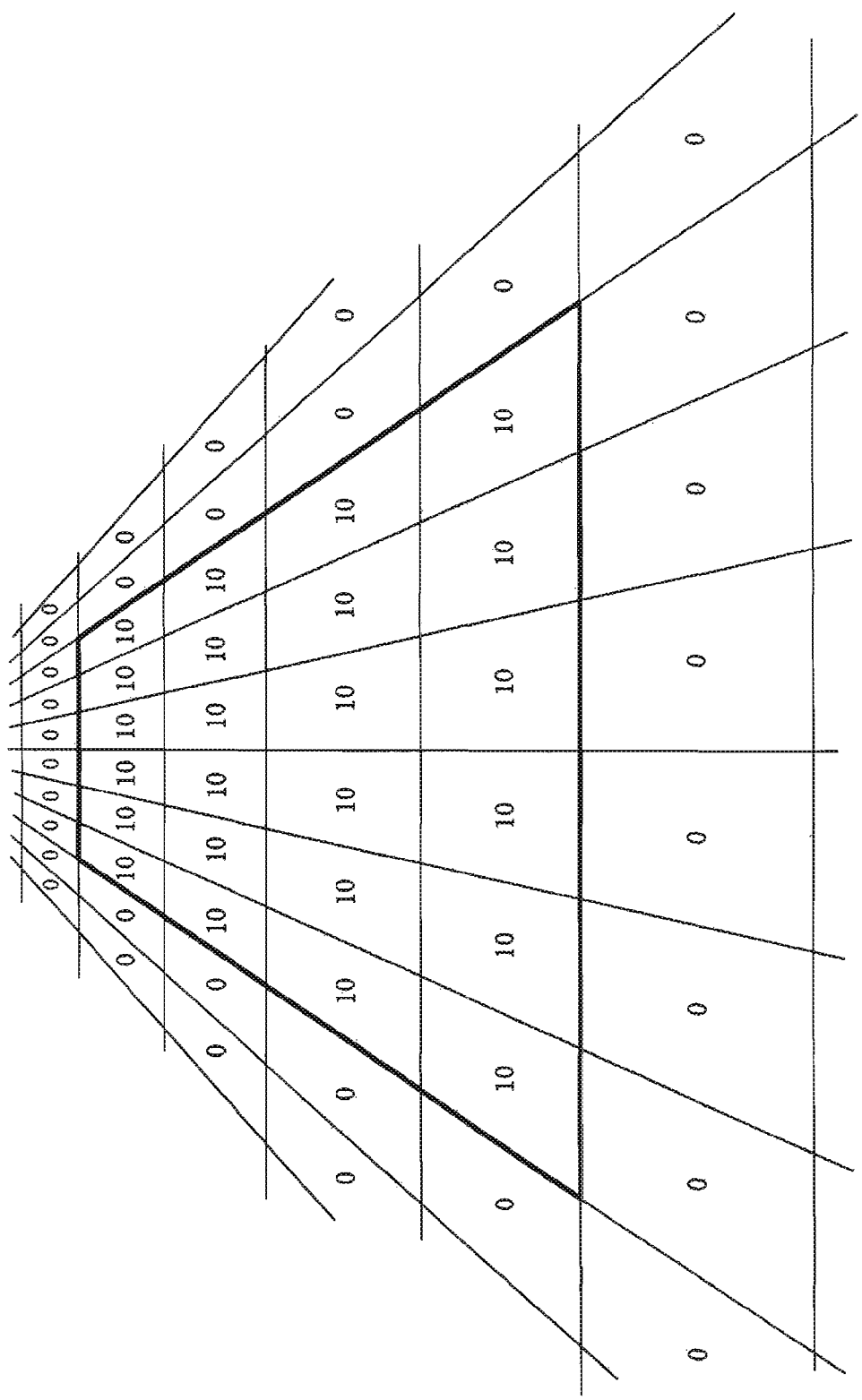
FIG. 18 illustrates the amount of information per pixel that is represented in figure to explain image processing according to the second embodiment of the invention.
Figure 19:
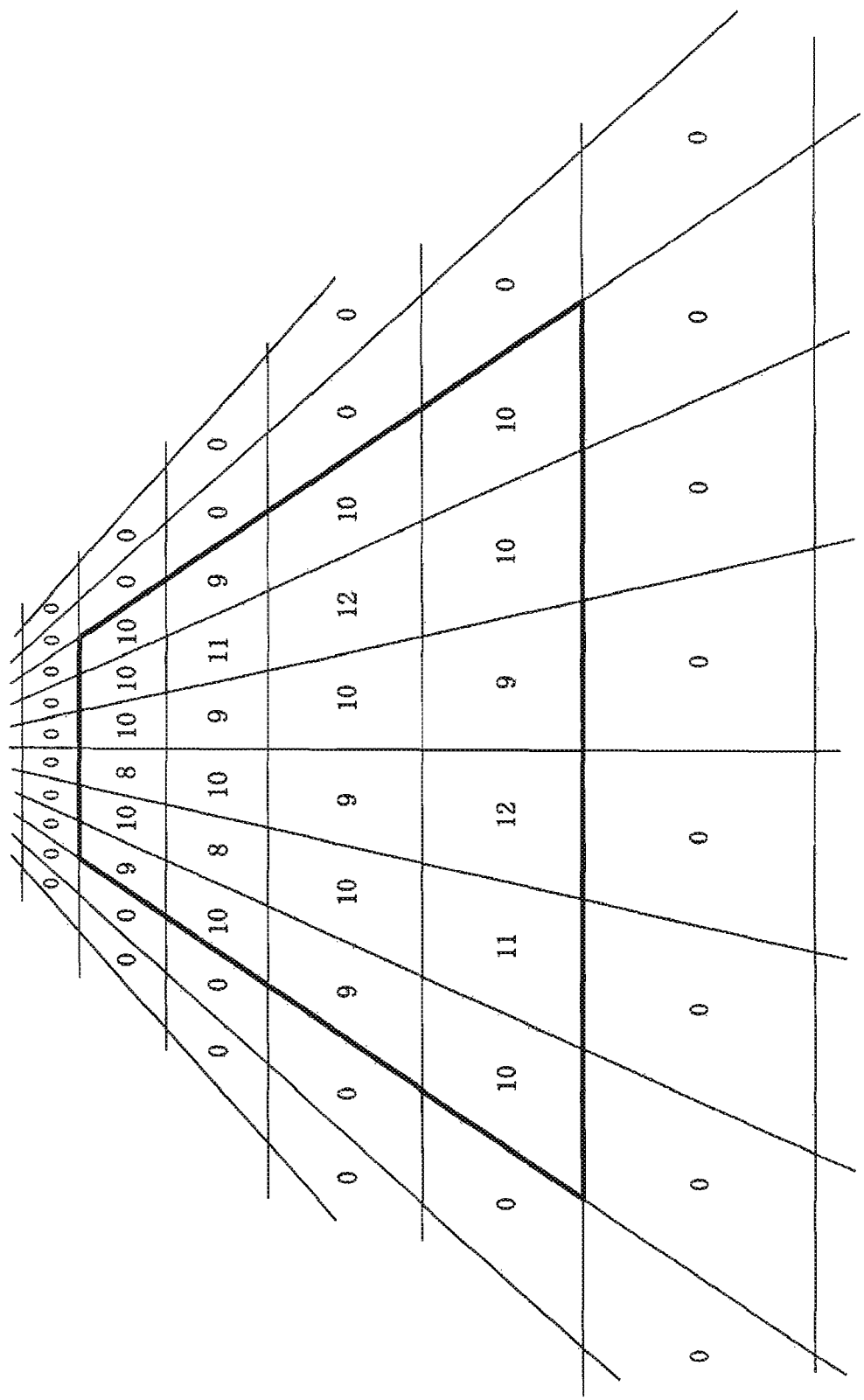
FIG. 19 illustrates the amount of information per pixel that is represented in figure to explain image processing according to the second embodiment of the invention.
Figure 20:
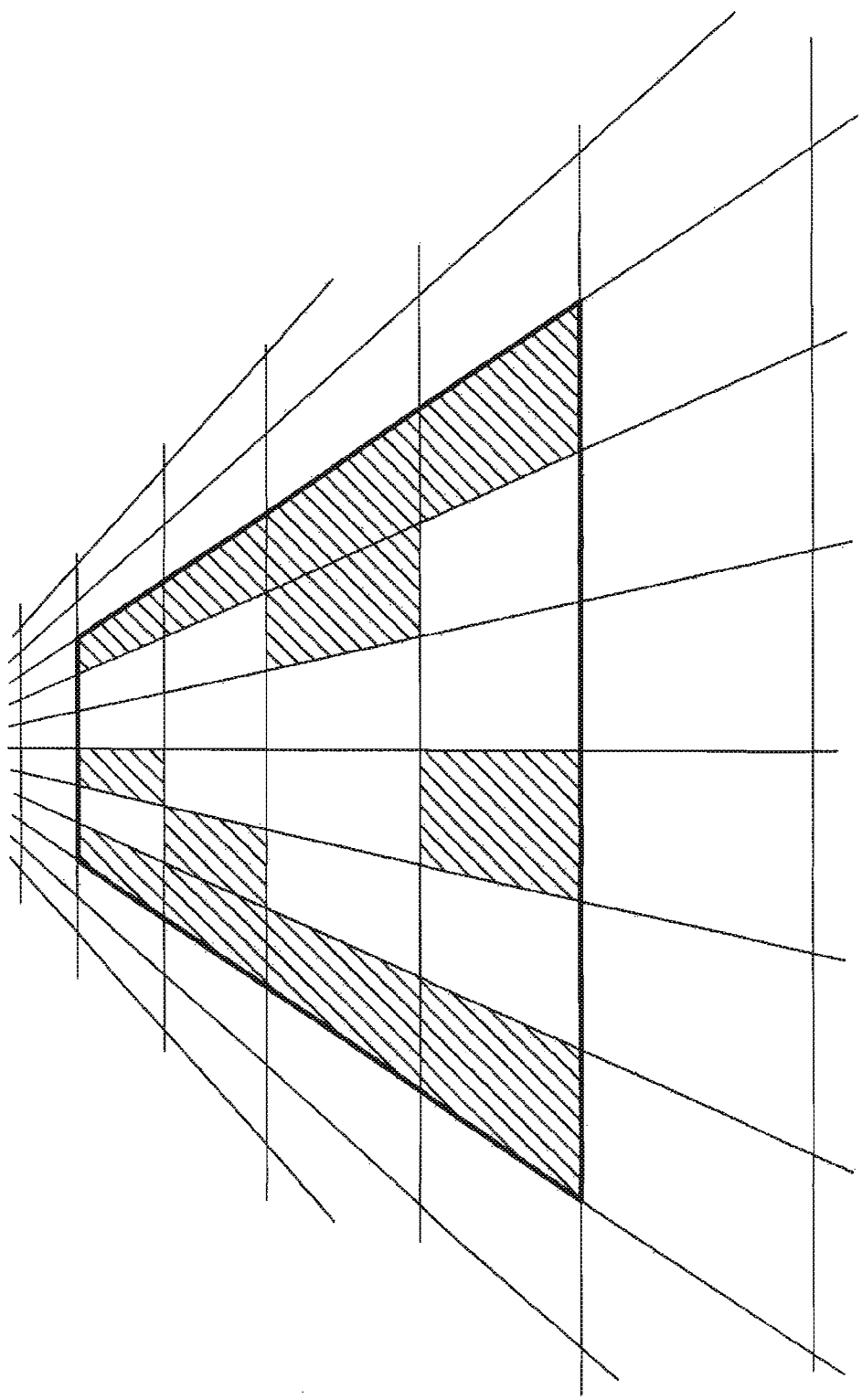
FIG. 20 illustrates the amount of information per pixel that is represented in figure to explain image processing according to the second embodiment of the invention.

For example, it is assumed that image data K1 shown in FIG. 17 is obtained by performing shape correction (J1) and color-tone correction of image I1, and image data K2 shown in FIG. 19 is obtained by performing shape correction (J2) and color-tone correction of image I2. In this case, while the color tone of each pixel in the image source is represented in 8 bits, the color tone of each pixel in the image data that is color-tone-corrected is represented in an accuracy of 10 bits. When detecting a modified part between the image K1 and the image K2, the modified-part detection unit 242 compares eight most significant bits to detect the modified part. For example, it detects pixels having a luminance difference of 2 or more between the image K1 (FIG. 17) and the image K2 (FIG. 19). Accordingly, as shown in FIG. 20, the modified part L2 that is modified from the image K1 to the image K2 is detected.

At step ST380, the color-tone data extracting unit 251 extracts color-tone data of each pixel in the modified part by comparing the color-tone-converted image K with the modified part L.

Figure 21:
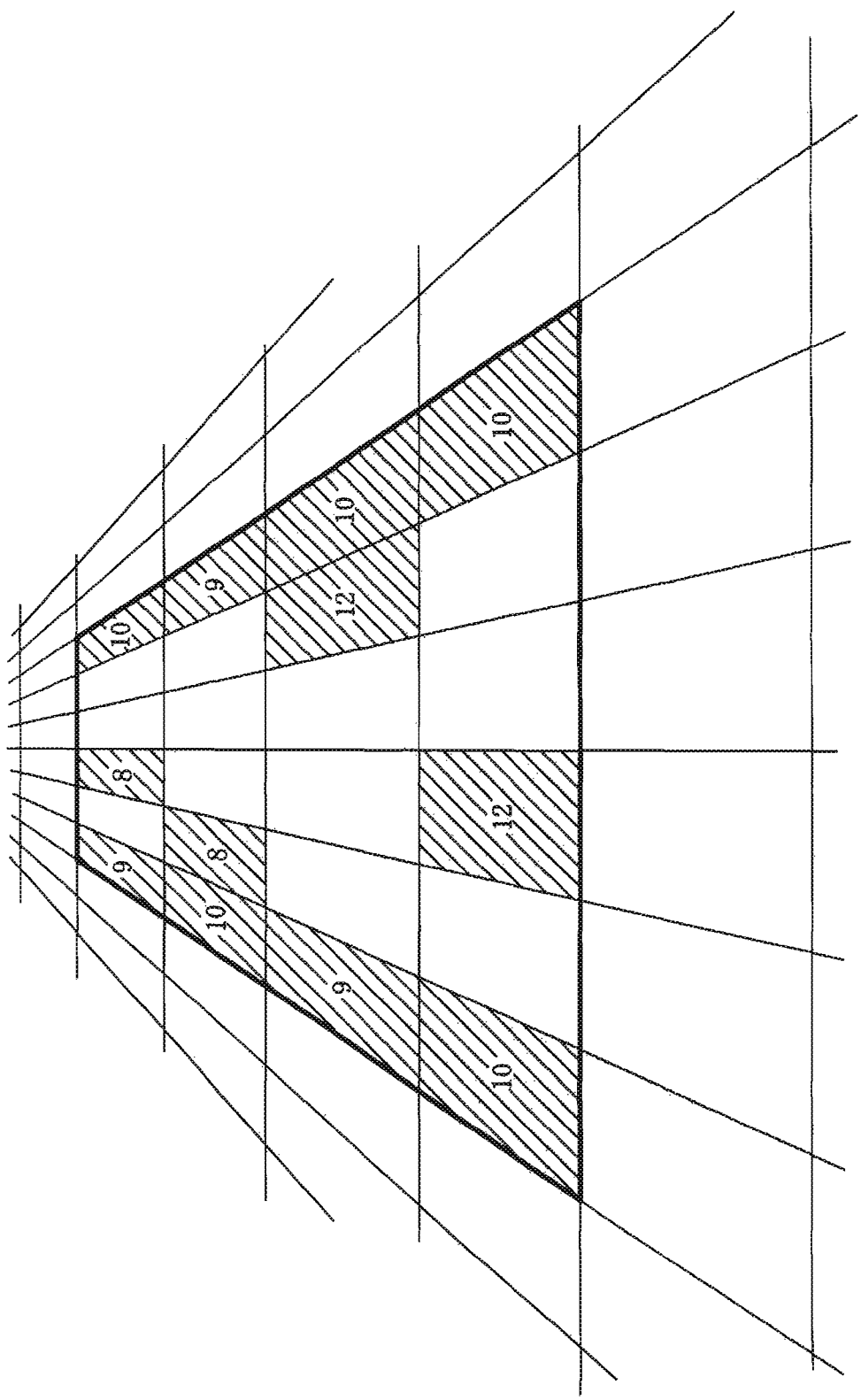
FIG. 21 illustrates the amount of information per pixel that is represented in figure to explain image processing according to the second embodiment of the invention.

At step ST390, the modified-image data generation unit 252 generates modified-image data by adding the extracted color-tone data to each pixel of the modified part ((M) in FIG. 16). In more detail, for example, the color-tone data of pixel corresponding to the modified part L2 is extracted from the color-tone-corrected image K2 (FIG. 19), and the extracted color-tone data is added to each pixel. As a result, as shown in FIG. 21, the modified image M2 is generated in which the color-tone data is added to each pixel of the modified part.

Steps ST400 to ST440 are the same as those of the first embodiment.

That is, after the modified-image data M is transmitted to the projector 300 via the USB cable 500, a current-image frame is generated in the projector 300 and an image is projected on the screen 400.

The second embodiment further has the following effect in addition to the effect of the first embodiment.

(7) Since shape conversion is performed and then color-tone correction is performed, the shape conversion and color-tone correction can be successively carried out through a series of graphic processes of the PC 200. For instance, in the first embodiment in which the modified part is detected after shape conversion and before color-tone correction, since the image data is sent to the modified-part detection unit 242 after the shape conversion, a series of graphic processes of the shape conversion and color-tone correction needs to be interrupted.

Accordingly, since a series of graphic processes of the shape conversion and color-tone correction is successively performed in the second embodiment, it is possible to perform high-speed graphic processing.

Figure 22:
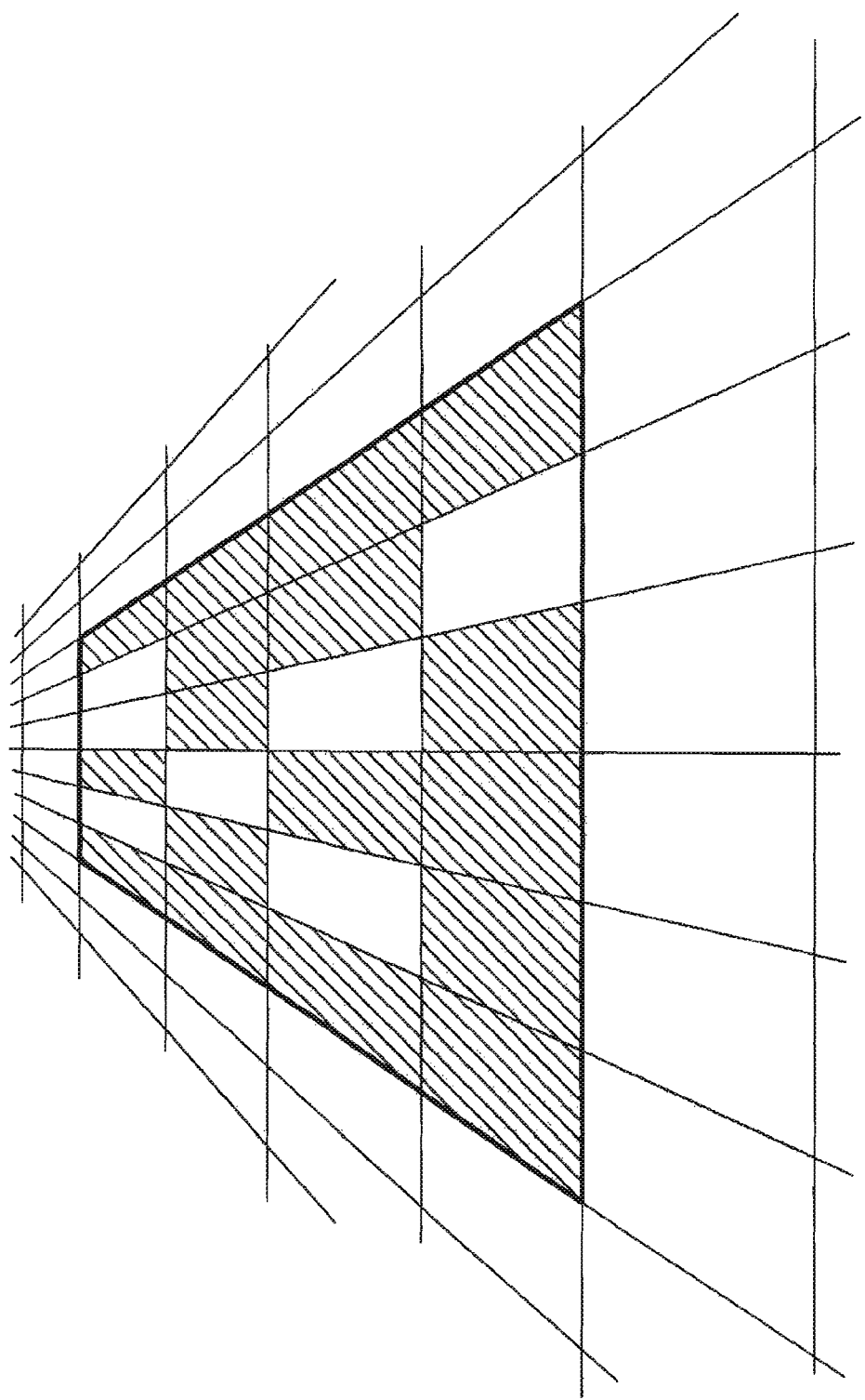
FIG. 22 illustrates a modified part that is detected with a high accuracy by comparing image data with each other after color-tone correction according to the second embodiment of the invention.

(8) After color-tone correction is carried out, color information of each pixel is accurately corrected. Accordingly, as shown in FIG. 22, there is a problem in that when the image data are compared with each other after color-tone correction, approximately whole of the image is detected as a modified part. However, since the modified part is detected with an accuracy of not more than the amount of information representing the color tone after color correction, only a pixel of which color tone has changed by more than a predetermined amount can be detected as a modified part. Accordingly, it is possible to obtain an appropriate amount of the modified-image data without detecting an excessive number of pixels as the modified part.

As a result, it is possible to appropriately maintain the frame rate on the projector 300 by the transmission rate by the signal transmission unit.

Third Embodiment

Next, a third embodiment of the invention will be described with reference to FIGS. 23 to 25.

A basic construction of the third embodiment is the same as that of the second embodiment except generation of an image preserved in the PC 200.

Figure 23:
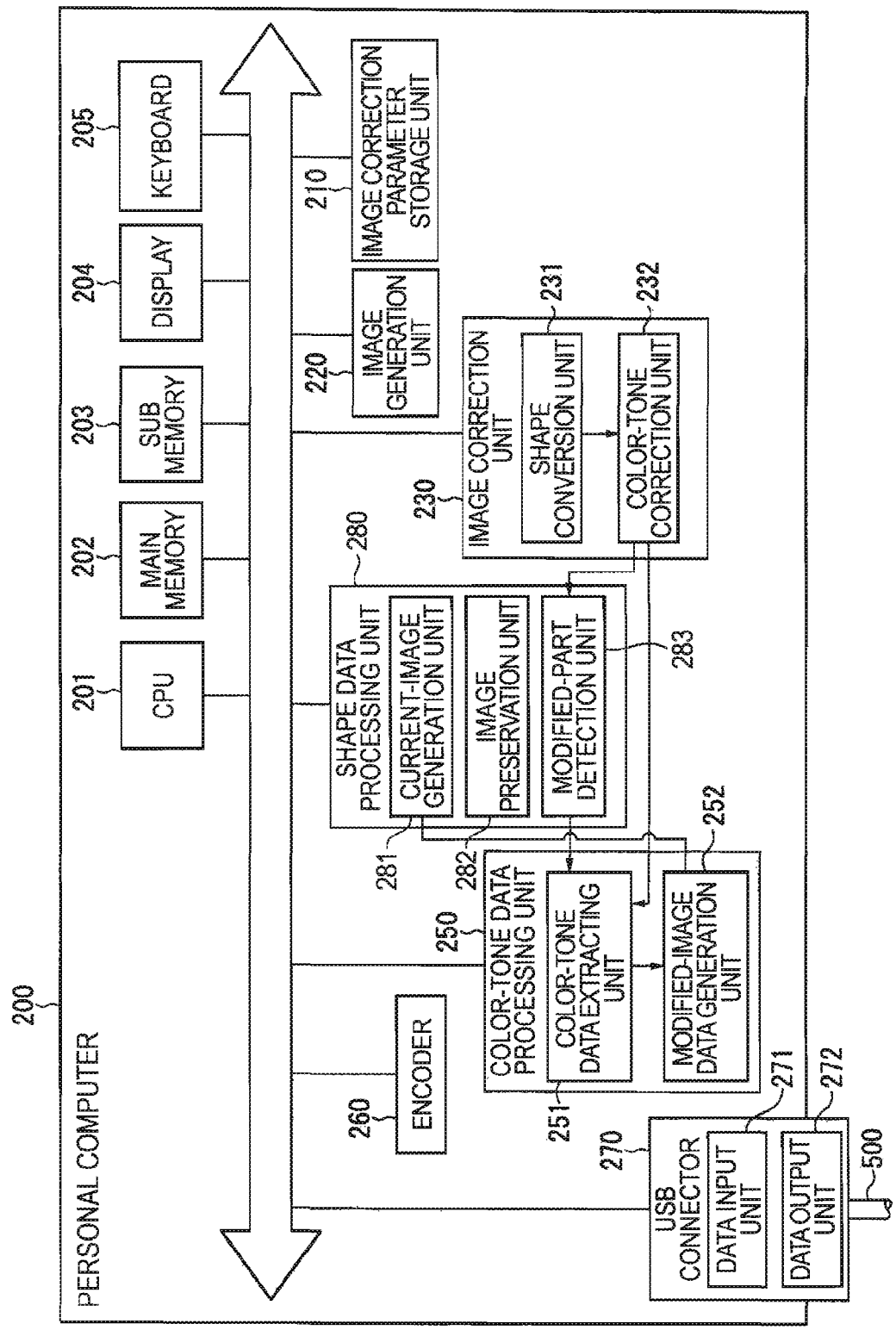
FIG. 23 is a block diagram of a PC according to a third embodiment of the invention.

That is, referring to FIG. 23, since the modified-image data generation unit 252 generates modified-image data to be transmitted to the projector 300, the modified-image data is transmitted to the projector 300 and, at the same time, is fed back to the shape data processing unit 280. A current-image generation unit 281 of the shape data processing unit 280 generates current-image frame data based on the modified-image data. The current-image frame generated by the current-image generation unit 281 is preserved in the image preservation unit 282, and is used to detect the modified part in the modified-part detection unit 283.

Referring to FIG. 23, the image correction unit 230 includes a shape conversion unit 231 and a color-tone correction unit 232.

The image data generated in the image generation unit 220 is shape-corrected (trapezoid-corrected) in the shape conversion unit 231, and is color-tone-corrected in the color-tone correction unit 232. The image data that is color-tone-corrected in the color-tone correction unit 232 is sent to the shape data processing unit 280.

The shape data processing unit 280 includes a current-image generation unit 281, an image preservation unit 282, and a modified-part detection unit 283.

The current-image generation unit 281 receives modified-image data generated by the modified-image data generation unit 252. The current-image generation unit 281 generates latest image frame data based on the modified image generated by the modified-image data generation unit 252. That is, this is similar to a case where the projector 300 generates the current-image frame data from the modified-image data.

The image preservation unit 282 preserves the image data generated by the current-image generation unit 281.

The modified-part detection unit 242 compares the latest shape-converted, color-tone-corrected image data with preceding converted-image data preserved in the image preservation unit, and detects as a modified part a different part between the latest image and the preceding image.

A method of projecting an image source from the projector 300 will be described with reference to a flow chart of FIG. 24 and an image shown in FIG. 25.

Figure 24:
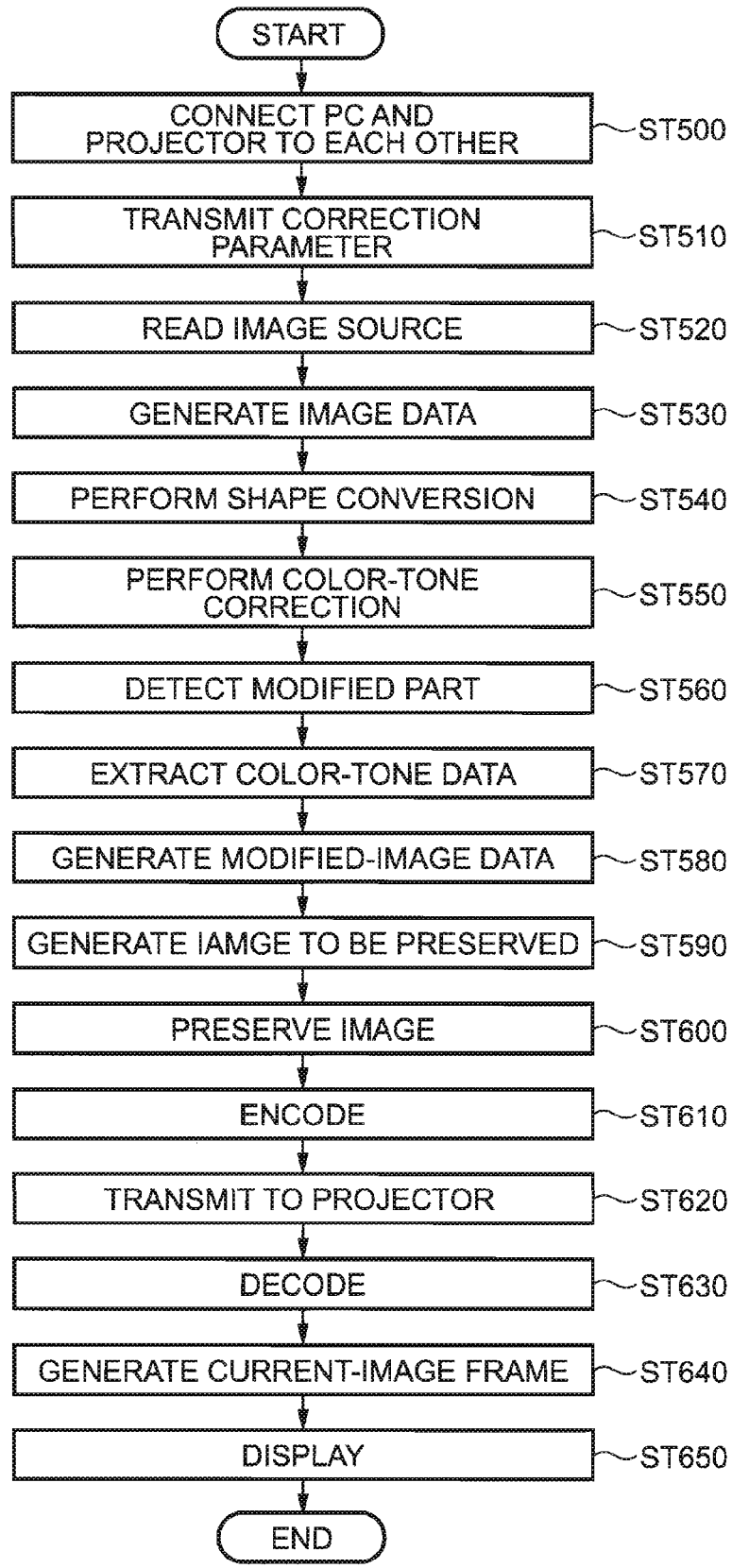
FIG. 24 is a flow chart of a method of projecting an image source from a projector according to the third embodiment of the invention.

In FIG. 24, steps ST500 to ST550 are the same as the steps ST300 to ST350 of the second embodiment. That is, operation of performing trapezoid correction (O) and color-tone correction (P) of an image source (N) in FIG. 25 is the same as that of the second embodiment.

At step ST560, the modified-part detection unit 283 detects a modified part Q by comparing color-tone-corrected image data with preceding image frame data. At step ST570, the color-tone data extracting unit 251 extracts color-tone data of each pixel in the modified part by comparing the color-tone-corrected image P with the modified part Q.

Figure 25:
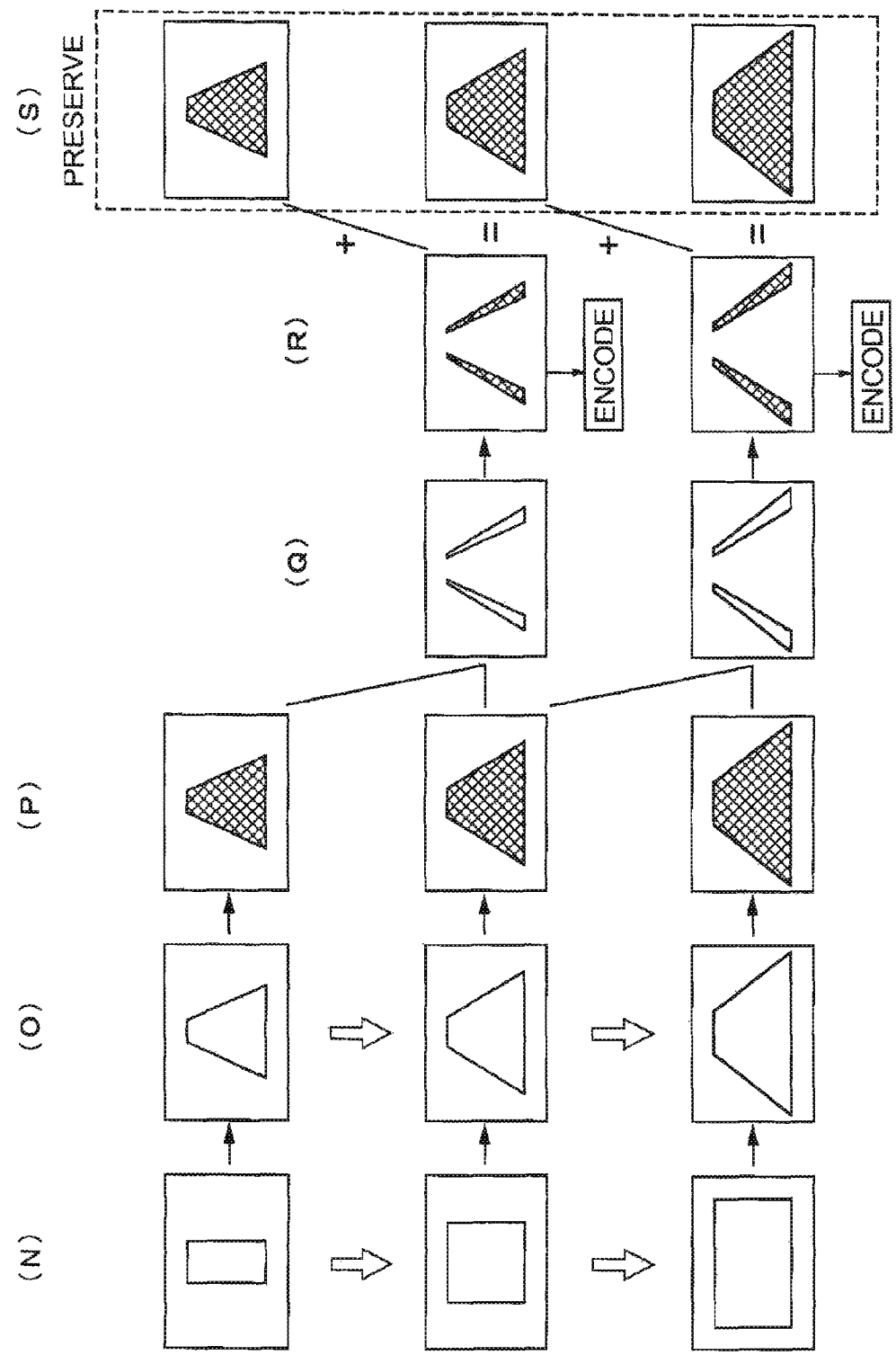
FIG. 25 illustrates a method of processing an image until an image source is projected from a projector according to the third embodiment of the invention.

At step ST580, the modified-image data generation unit 252 generates modified-image data by adding the extracted color-tone data to each pixel of the modified part ((R) in FIG. 25).

At step ST590, the modified-image data is fed back to the shape data processing unit 280, and the current-image generation unit 281 generates new current-image frame data S by synthesizing the modified-image data with the preceding image frame data.

At step ST600, the current-image frame data generated by the current-image generation unit 281 is preserved in the image preservation unit.

At step ST610, the modified-image data generated by the modified-image data generation unit 252 is encoded by the encoder 260, and, at step ST620, is transmitted to the projector 300 via the USB cable 500.

Next, steps ST620 to ST650 are the same as those of the first embodiment.

That is, the modified-image data R is transmitted to the projector 300 via the USB cable 500. A current-image frame is generated in the projector 300, and an image is projected on the screen 400.

The third embodiment further has the following effect in addition to the effect of the above-mentioned embodiments.

(9) Since the modified-image data generated by the modified-image data generation unit 252 is fed back to the current-image generation unit 281 and the current-image frame data is generated in the current-image generation unit, the current-image generation unit 281 can receive the same image data as that transmitted from the PC 200 to the projector 300, and generate image data equal to the current-image frame data that is currently preserved in the projector 300. Since the current-image data generated by the current-image generation unit 281 and the latest shape-converted image data are compared with each other, it is possible to detect a modified part of the latest shape-converted image data that is modified from the same current-image data as that preserved in the protector 300. As a result, the projector 300 can properly generate the latest current-image frame data by transmitting the generated modified-image data to the projector 300.

While the invention has been described with reference to exemplary embodiments thereof, it will be understood by those skilled in the art that various changes in form and details may be made therein without departing from the scope of the invention as defined by the following claims.

Even though the above-mentioned embodiments describe a case where the modified-image data is transmitted from the PC to the projector, the shape-converted and color-tone-corrected image data may be transmitted from the PC to the projector in predetermined timing. In a case where the modified-image data is transmitted from the PC to the projector, the image data preserved in the PC and projector are different from each other. Accordingly, it is preferable that the entire image data is transmitted from the PC to the projector in an appropriate timing so that the image data preserved in the PC and projector can be equal to each other.

Signals may be transmitted from the PC to the projector in a wireless manner instead of via the USB cable.

When the modified-part detection unit detects the modified part by comparing the image data with each other, the accuracy of the amount of information noted among the amount of information indicating the color tone may vary. In this case, a user may randomly determine the accuracy of detection of the modified part, or automatically determine the accuracy of detection of the modified part so that the frame rate on the projector can be maintained.

In a case where the accuracy of detection of the modified part is automatically determined so that the frame rate on the projector can be maintained, for example, the maximum amount of data that is required to maintain the frame rate is set beforehand, and the amount of modified-image data is compared with the maximum amount of data. When the amount of modified-image data is larger than the maximum amount of data, the accuracy of detection may be lowered when the modified-image detection unit detects the modified part.

For example, when the modified-part detection unit detects the modified part with an accuracy of 8 bits, and the amount of modified-image data having color-tone data (for example, 10 bits) of each pixel added in the modified-image data generation unit is larger than the maximum amount of data that is required to maintain the frame rate, the accuracy of detection of the modified part of the modified-part detection unit is lowered to 6 or 5 bits. As a result, since the amount of modified-image data is automatically adjusted to be appropriate, it is possible to maintain the frame rate of image display by the projector.

The present invention may be applied to a projection system.

The entire disclosure of Japanese Patent Application No. 005-262826, filed Sep. 9, 2005 is expressly incorporated by reference herein.

What is claimed is:

1. A projection system comprising:
an information processing apparatus that carries out image processing on an image of an image source in which color tone of each pixel is represented with a predetermined amount of information, the image source including a plurality of image data, including latest image data and preceding image data; and
a projector that projects an image based on an image data signal outputted from the information processing apparatus; and
a signal transmission unit that carries signals between the information processing apparatus and the projector,
wherein:
the information processing apparatus includes:
a modified-part detection unit that compares each latest image data with immediately preceding image data to detect a modified part, the modified part being a different part of the latest image data that is modified from the immediately preceding image data;
a modified-image data generation unit that generates modified-image data of the modified part by adding color-tone data to each pixel in the modified part detected by the modified-part detection unit; and
a color-tone correction unit that carries out color-tone correction of the image data according to color characteristics of the projector,
the projector includes a current-image frame generation unit that generates a new current-image frame based on the modified-image data from the information processing apparatus,
the modified-part detection unit detects the modified part with an accuracy of not more than the amount of information indicating the color tone of each pixel of the image source,
the modified-part detection unit compares image data with each other that are color-tone-corrected by the color-tone correction unit, and detects the modified part with an accuracy of not more than the amount of information indicating the color tone after color-tone correction.

2. The projection system according to claim 1, wherein when detecting the modified part by comparing the image data with each other, the modified-part detection unit varies the accuracy of the amount of information that is noted among the amount of information indicating color tone.

3. The projection system according to claim 1, wherein the modified-part detection unit identifies the modified part.

4. An information processing apparatus performing image processing on an input image source, the input image source including a plurality of image data, including latest image data and preceding image data, outputting and displaying the image-processed image source on a projector connected via a signal transmission unit, the information processing apparatus comprising:
a modified-part detection unit that compares each latest image data with immediately preceding image data to detect a modified part, the modified part being a different part of the latest image data that is modified from the immediately preceding image data;
a modified-image data generation unit that generates the modified-image data of the modified part by adding color-tone data to each pixel in the modified part detected by the modified-part detection unit; and
a color-tone correction unit that carries out color-tone correction of the image data according to color characteristics of the projector
wherein:
the projector includes a current-image frame generation unit that generates a new current-image frame based on the modified-image data from the information processing apparatus,
the modified-part detection unit detects the modified part with an accuracy of not more than the amount of information indicating the color tone of each pixel of the image source, and the modified-part detection unit compares image data with each other that are color-tone-corrected by the color-tone correction unit, and detects the modified part with an accuracy of not more than the amount of information indicating the color tone after color-tone correction.

5. A method of generating modified-image data transmitted from an information processing apparatus to a projector in a projection system including the information processing apparatus that carries out image processing on an image of an image source in which color tone of each pixel is represented with a predetermined amount of information, the image source including a plurality of image data, including latest image data and preceding image data, the projector that projects an image based on an image data signal outputted from the information processing apparatus, and a signal transmission unit that carries signals between the information processing apparatus and the projector, the method comprising:

comparing each latest image data with immediately preceding image data to detect a modified part, the modified part being a different part of the latest image data that is modified from the immediately preceding image data;

generating converted-image data of the modified part by adding color-tone data to each pixel in the modified part detected by the operation of detecting as a modified part; and performing color-tone correction of the image data according to color characteristics of the projector, wherein:

the operation of detecting as a modified part detects the modified part with an accuracy of not more than the amount of information indicating the color tone of each pixel of the image source, and the operation of detecting as a modified part compares image data with each other that are color-tone-corrected in the operation of performing color-tone correction, and detects the modified part with an accuracy of not more than the amount of information indicating the color tone after color-tone correction.

6. The method according to claim 5, further comprising:

transmitting the generated converted-image data of the modified part from the information processing apparatus to the projector.

* * * * *